United States Patent
Suetsugu et al.

(10) Patent No.: US 6,807,226 B1
(45) Date of Patent: Oct. 19, 2004

(54) APPARATUS HAVING COMMUNICATION FUNCTION, METHOD FOR GROUPING SUCH APPARATUSES, AND RECORDING MEDIUM FOR USE WITH SUCH METHOD

(75) Inventors: Junji Suetsugu, Nara (JP); Atsushi Nakao, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 787 days.

(21) Appl. No.: 09/617,048

(22) Filed: Jul. 14, 2000

(30) Foreign Application Priority Data

Jul. 15, 1999 (JP) .......................................... 11-202364

(51) Int. Cl.$^7$ ............................................. H04L 12/28
(52) U.S. Cl. ...................... 375/224; 370/396; 370/399; 370/265; 379/1.01; 379/100.15; 379/93.09; 379/93.11; 709/217
(58) Field of Search ................................ 370/396, 399, 370/265; 709/217; 379/1.01, 100.15, 93.09, 93.11

(56) References Cited

U.S. PATENT DOCUMENTS

| | | | | |
|---|---|---|---|---|
| 4,545,013 A | * | 10/1985 | Lyon et al. .................. | 714/712 |
| 4,972,470 A | * | 11/1990 | Farago ........................ | 713/192 |
| 5,049,873 A | * | 9/1991 | Robins et al. ......... | 340/825.01 |
| 5,309,434 A | * | 5/1994 | Maekawa .................... | 370/265 |
| 5,400,325 A | | 3/1995 | Chatwani et al. | |
| 5,757,680 A | * | 5/1998 | Boston et al. .............. | 702/121 |
| 5,922,047 A | * | 7/1999 | Newlin et al. .............. | 709/217 |
| 6,363,137 B1 | * | 3/2002 | Nakao et al. .............. | 379/1.01 |

FOREIGN PATENT DOCUMENTS

| EP | 0 750 256 | 12/1996 |
|---|---|---|
| EP | 0 800 329 | 10/1997 |
| JP | 9-200860 | 7/1997 |

OTHER PUBLICATIONS

Jerry D. Gibson; The Communications Handbook; 1996; CRC Press, Inc.; Chapter 42, Section 42.7, pp. 583–590.*

Canosa et al., "Design and Evaluation of a MARS Model Implementation", ATM Workshop Proceedings, 1998 IEEE, May 26–29, 1998, pp. 349–354.

* cited by examiner

Primary Examiner—Stephen Chin
Assistant Examiner—Sudhanshu C. Pathak
(74) Attorney, Agent, or Firm—Nixon & Vanderhye P.C.

(57) ABSTRACT

An apparatus of the present invention is an apparatus including a communication section for communicating with another apparatus. The apparatus includes: a registration detection section for detecting grouping registration information which is provided to each of a plurality of apparatuses to be grouped and registered; a storage section for storing group information which indicates that the apparatus and the other apparatus are in the same group; and a control section for controlling the communication section, the registration detection section and the storage section. The control section generates connection ID information based on the detected grouping registration information, receives first connection information transmitted from the other apparatus, determines whether or not the first connection information matches with second connection information which is based on the connection ID information and, if it is determined that the first connection information matches with the second connection information, stores the first connection information as the group information in the storage section.

16 Claims, 26 Drawing Sheets

FIG.31

Operation of registration button

Time →

ON  OFF  ON  OFF  ON  OFF  ON

⬇

Timing pattern 2 1   4 6   1 4   3 4   2 7   5 1   1 2

⬇ Connection ID is obtained by extracting and sequentially arranging only effective digit(s) of each value Connection ID : 2413251

FIG.32

| Name of group | Connection ID |
|---|---|
| Group A | 17647211 |
| Group B | 6594 |
| Group C | 2413251 |
| ⋮ | ⋮ |
| Group X | 12421 |

APPARATUS HAVING COMMUNICATION FUNCTION, METHOD FOR GROUPING SUCH APPARATUSES, AND RECORDING MEDIUM FOR USE WITH SUCH METHOD

BACKGROUND OF THE INVENTION

1. Field of the Invention

The present invention relates to an apparatus which can be easily and securely grouped with other such apparatus, a method for grouping the apparatuses together, and a recording medium for use with such a method.

2. Description of the Related Art

As a conventional method for grouping together a plurality of apparatuses capable of, communicating with one another, Japanese Laid-Open Publication No. 9-200860 discloses a method for registering a sub unit in a main unit by using a recording medium. The main unit disclosed in this publication includes a section for storing an identification code, and a section for accessing the recording medium. The identification code of the sub unit which is stored in the recording medium can be registered in the main unit by inserting the recording medium in which the identification code of the sub unit has been recorded into the main unit. Thus, a sub unit registration can be easily be accomplished.

However, the sub unit registration method disclosed in Japanese Laid-Open Publication No. 9-200860 requires a recording medium in which the identification code of the sub unit has been registered in advance. Moreover, the identification code needs to be set to a different value for each sub unit. Therefore, the identification code management is very difficult. Furthermore, the sub unit registration is very difficult to accomplish when the apparatus does not have unique ID information such as a telephone number. In addition, a main unit is always necessary when registering an apparatus. Therefore, sub units cannot be grouped and registered under circumstances where there is no main unit.

SUMMARY OF THE INVENTION

According to one aspect of this invention, there is provided an apparatus including a communication section for communicating with another apparatus. The apparatus includes: a registration detection section for detecting grouping registration information which is provided to each of a plurality of apparatuses to be grouped and registered; a storage section for storing group information which indicates that the apparatus and the other apparatus are in the same group; and a control section for controlling the communication section, the registration detection section and the storage section. The control section generates connection ID information based on the detected grouping registration information, receives first connection information transmitted from the other apparatus, determines whether or not the first connection information matches with second connection information which is based on the connection ID information and, if it is determined that the first connection information matches with the second connection information, stores the first connection information as the group information in the storage section.

In one embodiment of the invention, the storage section is capable of storing the group information even after a power supply is turned OFF.

In one embodiment of the invention, the storage section is capable of deleting the group information stored in the storage section by turning OFF a power supply.

In one embodiment of the invention, the apparatus further includes a cancellation detection section for detecting grouping registration cancellation information which is provided to an apparatus to be canceled from the grouping. The control section generates connection ID information based on the detected grouping registration cancellation information, determines whether or not the first connection information stored in the storage section matches with the second connection information and, if it is determined that the first connection information matches with the second connection information, deletes the first connection information stored in the storage section.

In one embodiment of the invention, the apparatus further includes a location detection section for detecting location information which indicates a location of the apparatus. The control section deletes the first connection information stored in the storage section depending upon the detected location information.

In one embodiment of the invention, the apparatus further includes a time detection section for detecting an elapsed time. The control section deletes the first connection information stored in the storage section depending upon the detected elapsed time.

In one embodiment of the invention, the control section measures the number of times the apparatus has been connected to the other apparatus and, if the measured number of times exceeds a predetermined number of times, deletes the first connection information stored in the storage section.

In one embodiment of the invention, the apparatus further includes a display section for displaying a list of at least one connection information including the first connection information stored in the storage section.

In one embodiment of the invention, the storage section stores an operation procedure of the apparatus. At least one of the plurality of apparatuses which have been grouped and registered operates according to the operation procedure stored in the storage section.

In one embodiment of the invention, at least one of the plurality of apparatuses which have been grouped and registered operates depending upon a combination of the plurality of apparatuses which have been grouped and registered.

In one embodiment of the invention, the control section authenticates the connection ID information when performing at least one of the grouping registration and grouping registration cancellation.

In one embodiment of the invention, at least one of the grouping registration and grouping registration cancellation is performed by a dedicated grouping apparatus.

In one embodiment of the invention, at least one of the grouping registration information and the grouping registration cancellation information represents at least one of: the number of times a button is depressed within a predetermined period and a timing of button depression: a timing of turning ON/OFF a light: sound information: a timing of vibration; wind force information; temperature information; speed information; and image information.

In one embodiment of the invention, the control section notifies a user that at least one of the grouping registration information and the grouping registration cancellation information has been performed.

According to another aspect of this invention, there is provided a method for grouping together a plurality of apparatuses including a first apparatus and a second apparatus. Each of the plurality of apparatuses includes a communication section for communicating with the other apparatuses. The method includes the steps of: providing the same grouping registration information to the plurality of apparatuses; generating, in each of the plurality of apparatuses, the same connection ID information based on the same grouping registration information provided; transmitting to the second apparatus first connection information which is based on the connection ID information generated in the first apparatus; and determining whether or not the first connection information transmitted from the first apparatus matches with second connection information which is based on the connection ID information generated in the second apparatus and, if it is determined that the first connection information matches with the second connection information, storing the first connection information in the second apparatus as group information which indicates that the first apparatus and the second apparatus are in the same group.

According to still another aspect of this invention, there is provided a recording medium in which a program is recorded, the program being provided for controlling a computer to perform a grouping process for grouping together a plurality of apparatuses including a first apparatus and a second apparatus. Each of the plurality of apparatuses includes a communication section for communicating with the other, apparatuses. The grouping process includes the steps of: providing the same grouping registration information to the plurality of apparatuses: generating, in each of the plurality of apparatuses, the same connection ID information based on the same grouping registration information provided: transmitting to the second apparatus first connection information which is based on the connection ID information generated in the first apparatus: and determining whether or not the first connection information transmitted from the first apparatus matches with second connection information which is based on the connection ID information generated in the second apparatus and, if it is determined that the first connection information matches with the second connection information, storing the first connection information in the second apparatus as group information which indicates that the first apparatus and the second apparatus are in the same group.

The functions of the present invention will now be described.

According to the present invention, grouping registration information can be externally provided. Thus, a user can easily select one or more of a plurality of apparatuses which the user wishes to be grouped with. Moreover, the level of security can be enhanced by generating connection ID information based on the registration information.

According to the present invention, group information can be stored even after turning OFF the power supply of an apparatus having a communication function. Thus, the user does not have to start the grouping operation over each time the power supply is turned ON/OFF.

According to the present invention, the group information can be deleted after turning OFF the power supply of an apparatus having a communication function. This is advantageous for an apparatus which is grouped with a different partner apparatus each time the apparatus is activated because group information which is no longer needed can be prevented from being stored.

According to the present invention, grouping registration cancellation information can be externally provided. Thus, a user can easily select one or more of a plurality of apparatuses which the user wishes to cancel from grouping. The phrase "to cancel an apparatus from grouping" as used herein is intended to mean, unless otherwise indicated, "to remove an apparatus from a group of apparatuses" and not "to dissolve the group" or "to remove from a group all the apparatuses of the group". Moreover, the level of security can be enhanced by generating connection ID information for cancellation based on the registration information.

According to the present invention, a location detection section can be used to detect the position of an apparatus having a communication function so as to delete the group information when the apparatus has moved out of a predetermined location or area. Thus, an apparatus can be promptly canceled from grouping when the apparatus has moved to a location such that the grouping is rendered meaningless, e.g., when the apparatus has moved out of the reach of radio waves in an environment of the radio wave communication.

According to the present invention, a time detection section can be used to measure the elapsed time so that the group information can be deleted after passage of a predetermined amount of time. Thus, the grouping can be promptly canceled when a time out occurs, thereby rendering the grouping meaningless.

According to the present invention, a section for measuring the number of times of connection can be used so that group information can be deleted when the number of times the connection has been made exceeds a predetermined number of times. Thus, it is possible to easily provide a service which is available for free until the number of times of connection exceeds the predetermined number of times. Moreover, the level of security can be enhanced by deleting the grouping information when the authentication fails repeatedly.

According to the present invention, within a predetermined period of time after registration information is input to an apparatus having a communication function, a list of apparatuses to which the same registration information has been input can be displayed, so that a user can select one or more of a plurality of apparatuses which the user wishes to be grouped with. Thus, even when the grouping operation accidentally concurs with another grouping operation by another user, only the apparatuses which have been specified by the user can be reliably grouped together.

According to the present invention, a predetermined operation procedure can be stored in a storage section by inputting the predetermined operation procedure to an apparatus having a communication function within a predetermined period of time after registration information is input to the apparatus or by inputting the predetermined operation procedure as operation registration information. Thus, some or all of the apparatuses which have been grouped together can be controlled to operate according to the stored operation procedure. It is possible to provide an interconnection operation among apparatuses capable of communicating with one another which are associated with one another by grouping together the apparatuses in advance. For example, it is possible to turn ON the power supply of a VCR and automatically turn ON the power supply of a TV which has been grouped together with the VCR.

According to the present invention, unique operation procedures can be stored, in advance, respectively in various apparatuses capable of communicating with one another. Then, some or all of the apparatuses can operate according to the stored unique operation procedures depending upon the combination of apparatuses grouped together. There are some apparatuses for which it is easily expected, based on the characteristics of the apparatuses, that the apparatuses can operate in an interconnected manner with one another, e.g., a projector and a room light (the room light can be automatically dimmed when the power supply of the projector is turned ON). Information of an operation procedure for such an apparatus can be stored in the apparatus in advance, so that the user only has to group the apparatuses together to automatically register their operation procedures so that the apparatuses can operate in an interconnected manner with one another. Some existing projectors and room lights have an infrared communication unit incorporated therein so that they can be controlled by remote controls. The grouping operation can most easily be accomplished for such an apparatus having a communication function. In such a case, the remote control is a two-way remote control which can both receive and transmit data. An apparatus without a communication function can also be grouped with another apparatus by adding a communication function to the apparatus. Alternatively, the remote control of the projector and the remote control of the room light can be grouped together.

According to the present invention, an authentication may be required when performing at least one of the grouping registration for grouping together a plurality of apparatuses capable of communicating with one another and the grouping registration cancellation. Thus, the level of security can be enhanced by preventing the user from being grouped and registered with another undesired user or canceled from registration with another undesired user.

According to the present invention, a dedicated grouping apparatus can be used to perform at least one of the grouping registration for grouping together a plurality of apparatuses capable of communicating with one another and the grouping registration cancellation. Thus, it is possible to prevent the user from being grouped and registered with another undesired user or canceled from registration with another undesired user. Where a high level of security is required, the registration or the registration cancellation can be performed by a single particular dedicated grouping apparatus. In such a case, the particular dedicated grouping apparatus serves as a type of key to the user's apparatus having a communication function, thereby enhancing the level of security. The phrase "user's apparatus" as used herein is not intended to suggest that there is only one "user" or that the user owns only one "apparatus"; rather, a "user" may own more than one apparatus. Moreover, the phrase "partner" or "partner apparatus" as used herein is intended to mean a member of the group other than the "user's apparatus".

According to the present invention, at least one of the grouping registration information, the grouping registration cancellation information and the operation registration information can represent at least one of: the number of times a button is depressed within a predetermined period and a timing of button depression; a timing of turning ON/OFF a light; sound information; a timing of vibration; wind force information; temperature information; speed information; and image information. Such information can be detected by a detection section. For example, the user can easily perform a grouping operation by changing the number of times the registration button, the registration cancellation button, the operation registration button, or the like, is depressed and the timing of button depression. Regarding the timing of turning ON/OFF a light, the grouping operation can be performed by turning ON/OFF the power supply of a room light, for example. Regarding the sound information, the grouping operation can be performed by using a sound, for example. Regarding the timing of vibration, the grouping operation can be performed by touching an apparatus having a communication function with another apparatus having a communication function, for example. Regarding the wind force information, the user can perform the grouping operation by blowing onto an apparatus having a communication information, the user can perform the grouping operation by holding an apparatus having a communication function in the hand to transfer the body temperature to the apparatus, for example. Regarding the speed information, a car that is speeding can be grouped with a patrol car so that the car that is speeding can be tracked down by the patrol car. In such a case, it is necessary that the car that is speeding also has a communication function. Nevertheless, it is believed that this would be an effective measure in the near future, where it is expected that every automobile will be provided with an apparatus having a communication function for the purpose of controlling the traffic network with a communication network. Moreover, regarding the image information, the grouping registration or cancellation can be performed by using information of the fingerprint of the user as authentication means, for example.

According to the present invention, after at least one of the grouping registration and the registration cancellation is performed, the user can be notified of the grouping registration and/or the registration cancellation by means of a lamp, a buzzer, or the like.

According to the present invention, a grouping technique can be widely applied to various types of apparatuses capable of communicating with one another via the use of a recording medium in which a grouping program is recorded.

Thus, the invention described herein makes possible the advantages of: (1) providing an apparatus having a communication function which can easily be grouped and registered with intended ones of such apparatuses capable of communicating with one another without having to register an identification code in advance, without having to have unique ID information in advance, and even under circumstances where there is no main unit; (2) providing a method for grouping such apparatuses; and (3) providing a recording medium for use with such a method.

These and other advantages of the present invention will become apparent to those skilled in the art upon reading and understanding the following detailed description with reference to the accompanying figures.

BRIEF DESCRIPTION OF THE DRAWINGS

FIG. 31 illustrates how to generate connection ID from a registration button operation pattern according to Embodiment 1 of the present invention: and FIG. 32 illustrates a table containing group information.

DESCRIPTION OF THE PREFERRED EMBODIMENTS

Embodiments of the present invention will now be described with reference to the drawings.

(Embodiment 1)

Figure 1:
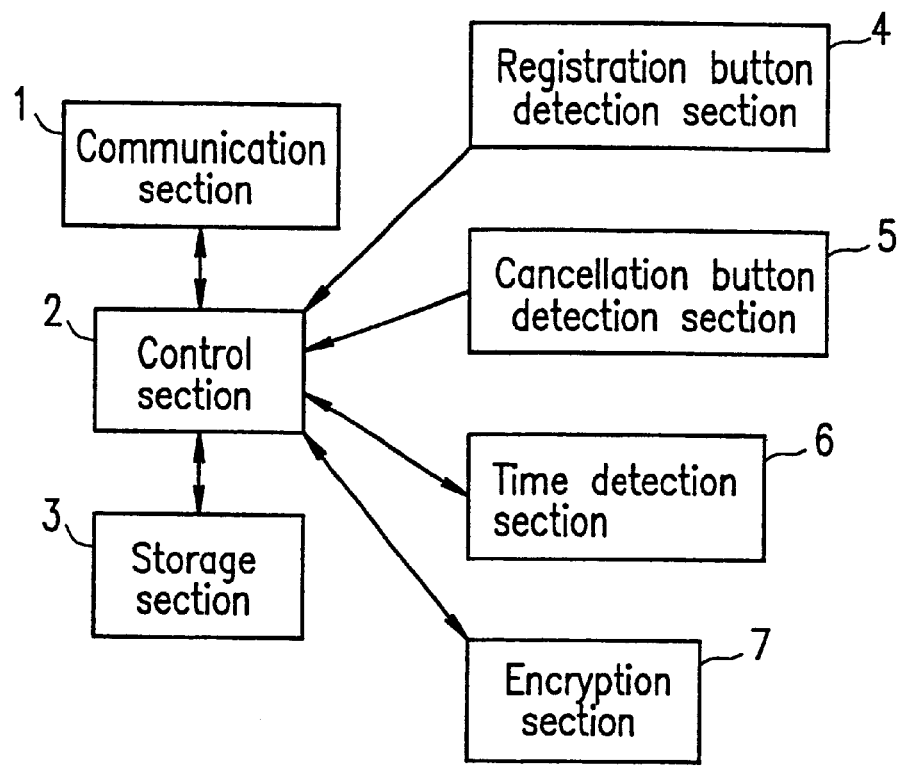
FIG. 1 is a block diagram illustrating a configuration of an apparatus having a communication function according to Embodiment 1 of the present invention.

FIG. 1 is a block diagram illustrating a configuration of an apparatus having a communication function according to this embodiment.

The apparatus having a communication function includes a communication section 1, a control section 2, a storage section 3, a registration button detection section 4, a cancellation button detection section 5, a time detection section 6, and an encryption section 7.

The communication section 1 includes a communication modem, a telephone line, a Bluetooth communication unit, and the like, and it communicates with another apparatus having a communication function. The control section 2 includes a control program and a CPU, or the like, for executing the control program. The control section 2 has a function of generating a connection ID which is required for a grouping operation based on signals from the registration button detection section 4 and the cancellation button detection section 5. Moreover, the control section 2 manages and controls the various sections. The storage section 3 includes a flash RAM memory, a hard disk, or the like, capable of storing information even after the power supply is turned OFF. The storage section 3 stores group information. Each of the registration button detection section 4 and the cancellation button detection section 5 includes a push button, a jog dial, or the like. The registration button detection section 4 notifies the control section 2 of an operation of a registration button, and the cancellation button detection section 5 notifies the control section 2 of an operation of a cancellation button. The time detection section 6 includes a program for performing a time measurement and a CPU, or the like, for executing the program. The time detection section 6 measures a time in response to an instruction from the control section 2. If a time out occurs, the time detection section 6 notifies the control section 2 of the time out. The encryption section 7 includes an encryption program and a CPU, or the like, for executing the encryption program. The encryption section 7 encrypts information in response to an instruction from the control section 2.

The apparatus having a communication function according to the present embodiment can be grouped with another apparatus, for example, as follows.

Figure 12:
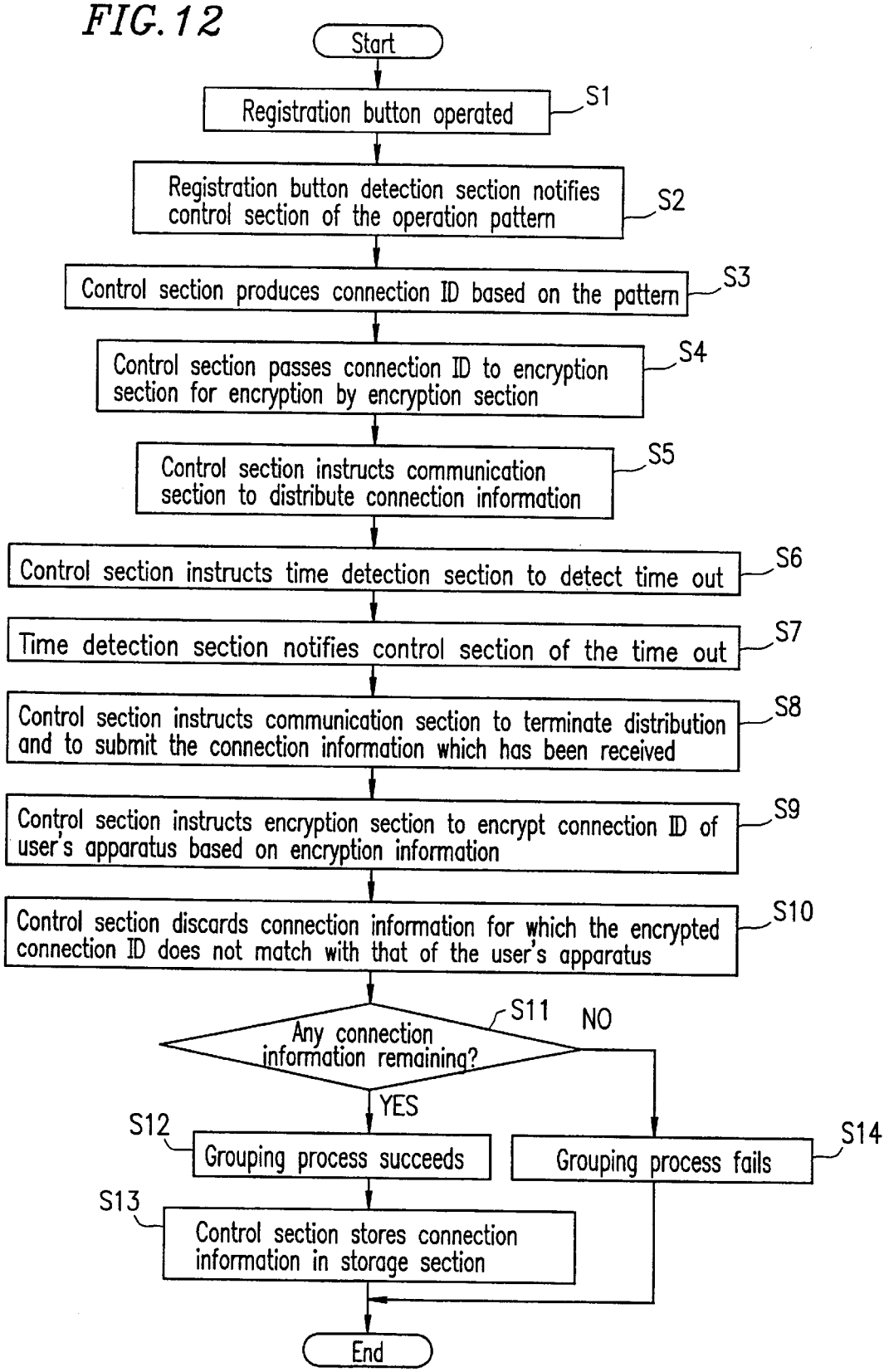
FIG. 12 is a flow chart illustrating a procedure of grouping registration according to Embodiment 1 of the present invention.

Referring to a flow chart illustrated in FIG. 12, the user depresses a registration button of the apparatus having a communication function at one or more certain timings (S1).

In response to this, the registration button detection section 4 notifies the control section 2 of the number of times of depression and the timing(s) of depression (i.e., an operation pattern) (S2).

Upon receiving the operation pattern, the control section 2 generates a connection ID based on the operation pattern (S3), and passes the connection ID to the encryption section 7 for encryption by the encryption section 7 (S4). As illustrated in FIG. 31, the connection ID is obtained by numerically converting the operation timings of the registration button. Preferably, the same connection ID is generated for substantially the same operation patterns.

Upon receiving the encrypted connection ID from the encryption section 7, the control section 2 instructs the communication section 1 to distribute connection information based on the encrypted connection ID (S5), and waits for a time out while having the time detection section 6 measure the time (S6). Then, when the control section 2 is notified by the time detection section 6 of a time out (S7), the control section 2 instructs the communication section 1 to terminate the distribution and receives the connection information which has been received by that time from other apparatuses (S8). Preferably, the same configuration and grouping registration process as those of the apparatus described in the present embodiment are employed by the partner apparatuses. Basically, this also applies to the dedicated registration/registration cancellation apparatus. Where a high level of security is required, the registration or the registration cancellation can be performed by a single particular dedicated apparatus. In such a case, the particular dedicated apparatus can be used as a type of key to the user's apparatus.

The control section 2 extracts encryption information from the received connection information and passes the encryption information to the encryption section 7, so that the connection ID of the user's apparatus is encrypted by the encryption section 7 based on the encryption information (S9). The control section 2 selects connection information for which the encrypted connection ID of the user's apparatus ("second connection information") matches with the received encrypted connection ID ("first connection information"), and discards the remainder of the connection information (S10).

The encryption information is the same as the encryption information used in S4 in a sense that they both are used to encrypt connection IDs. However, their contents of information is typically different from each other. This is because in the case of a radio environment, or the like, the connection ID information may be eavesdropped if it is transferred as it is. It would be difficult for an eavesdropper to know the original connection ID by, for example, distributing a connection ID encrypted with encryption information a (referred to as "A") which is obtained by converting the connection information with the encryption information a into an ID. When a connection ID which has been encrypted with encryption information β (referred to as "B" and different from "A") is received from the partner, it is confirmed that the partner is proper by confirming that an encryption of the original connection ID with the encryption information β results in "B", i.e., the same connection ID as the received encrypted connection ID. Typically, the encryption information α and β are randomly determined by the respective apparatuses and thus are different from each other.

If there is no more connection information for which the connection ID matches with that of the user's apparatus (S11), the grouping process fails (S14), thereby terminating the process. If there is any connection information remaining for which the connection ID matches with that of the user's apparatus (S11), the grouping process is successful (S12), in which case the control section 2 stores the connection information as one group information in the storage section 3 (S13). The storage section 3 stores the group information in a tabular form as illustrated in FIG. 32.

The connection ID can be transmitted along with communication data during a communication process after completing the grouping registration so that the connection ID can be used as a multicast address for distributing data among partners which have been grouped with the user's apparatus.

With the apparatus having a communication function according to the present embodiment having such a configuration, grouping can be canceled, for example, as follows.

Figure 13:
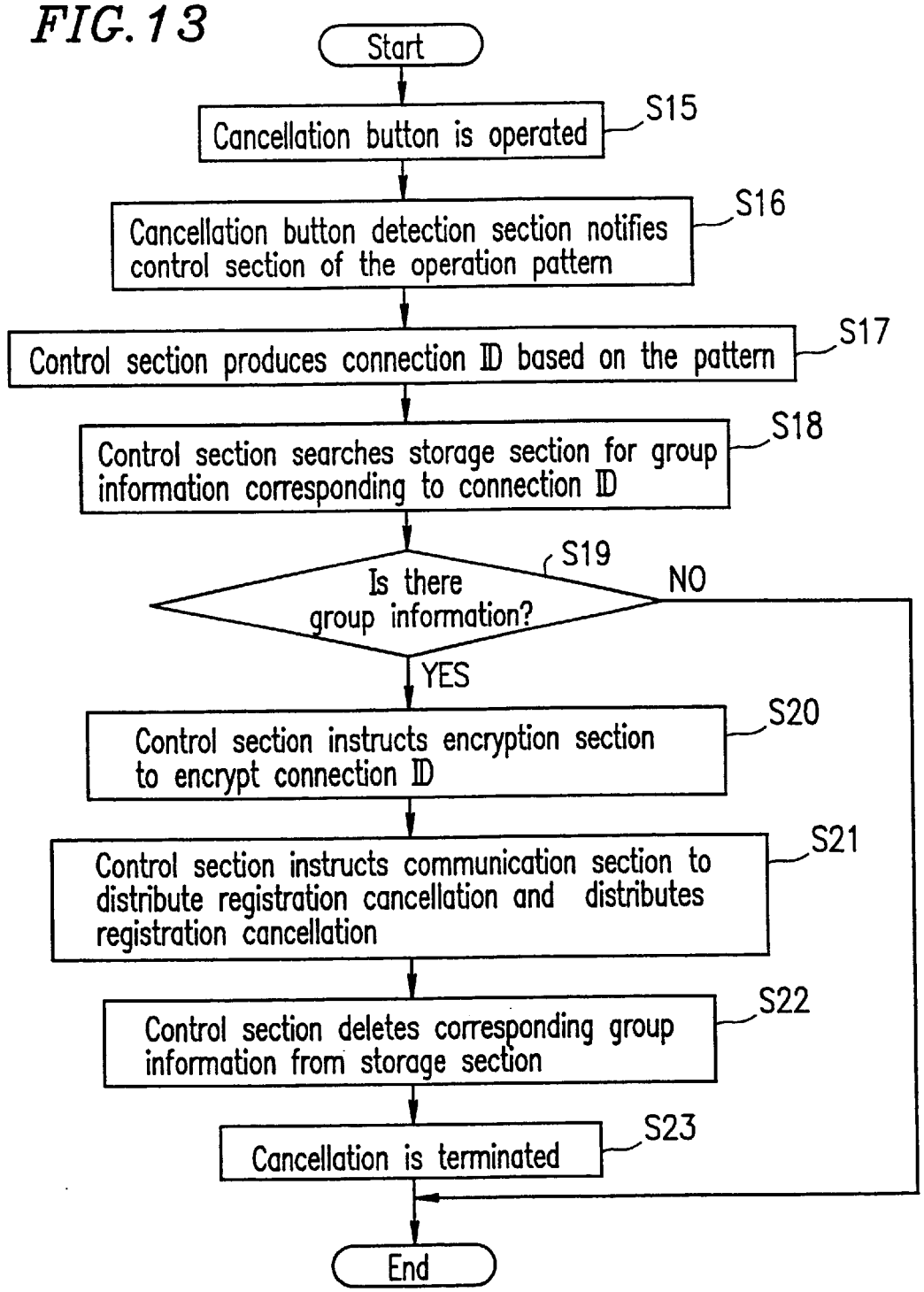
FIG. 13 is a flow chart illustrating a procedure of grouping registration cancellation according to Embodiment 1 of the present invention.

Referring to a flow chart illustrated in FIG. 13, the user depresses the cancellation button of the apparatus having a communication function at one or more certain timings (S15). In response to this, the cancellation button detection section 5 notifies the control section 2 of the number of times of depression and the timing(s) of depression (i.e., an operation pattern) (S16).

Upon receiving the operation pattern, the control section 2 generates a connection ID based on the operation pattern (S17), and searches the storage section 3 for the group information corresponding to the generated connection ID (S18). This connection ID is basically the same as the registration connection ID. However, if a protocol is appropriately defined in advance, a different connection ID can be used by extending the expression of the operation pattern. For example, where an apparatus has been grouped with another apparatus through a given operation pattern "A", the apparatus can be typically cancelled from registration by depressing the cancellation button in the same operation pattern "A". Alternatively, the grouping registration can be canceled from all the apparatuses belonging to the group by depressing the cancellation button in the operation pattern "A" and immediately holding down the cancellation button for 5 seconds or longer. In the latter case, the connection ID becomes different.

If there is no group information corresponding to the generated connection ID (S19), the process is terminated. If there is group information corresponding to the generated connection ID (S19), the control section 2 passes the connection ID in the group information to the encryption section 7 for encryption by the encryption section 7 (S20). Upon receiving the encrypted connection ID from the encryption section 7, the control section 2 instructs the communication section 1 to distribute the registration cancellation information based on the encrypted connection ID. In response to the instruction, the communication section 1 distributes the registration cancellation information (S21). Moreover, the control section 2 deletes the group information corresponding to the generated connection ID from the storage section 3 (S22) and the grouping cancellation is terminated (S23).

Typically, only the user's apparatus is canceled from the grouping registration. If there are only two apparatuses in the group, e.g., the user's apparatus and one partner apparatus, one of the apparatuses is typically cancelled when the other apparatus is cancelled. In order to cancel all or some of the apparatuses in one group, the protocol needs to be extended, as described above.

(Embodiment 2)

Figure 2:
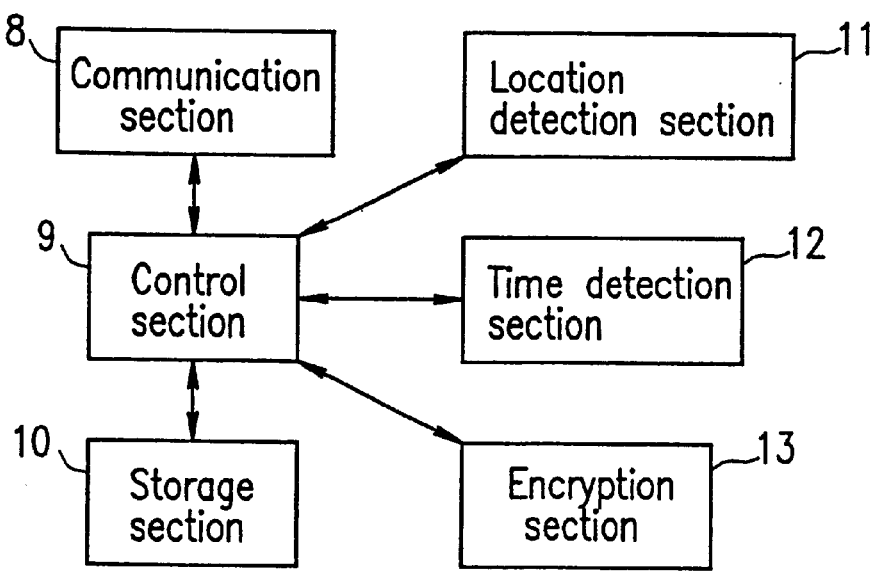
FIG. 2 is a block diagram illustrating a configuration of an apparatus for managing group information according to Embodiment 2 of the present invention.

FIG. 2 is a block diagram illustrating a configuration of an apparatus having a communication function according to this embodiment.

The apparatus having a communication function includes a communication section 8, a control section 9, a storage section 10, a location detection section 11, a time detection section 12, and an encryption section 13.

The communication section 8 communicates with another apparatus having a communication function. The control section 9 manages and controls the various sections. The storage section 10 includes a RAM, or the like, capable of temporary storage for storing group information. The location detection section 11 includes GPS (global positioning system), or the like, and provides location information, which represents the location of the apparatus, to the control section 9 in response to an instruction from the control section 9. The time detection section 12 measures a time in response to an instruction from the control section 9 and, if a time out occurs, notifies the control section 9 of the time out. The encryption section 13 encrypts information in response to an instruction from the control section 9.

With the apparatus having a communication function of the present embodiment having such a configuration, grouping can be canceled, for example, as follows.

First, a case where grouping is canceled based on the location of the apparatus will be described.

Figure 14:
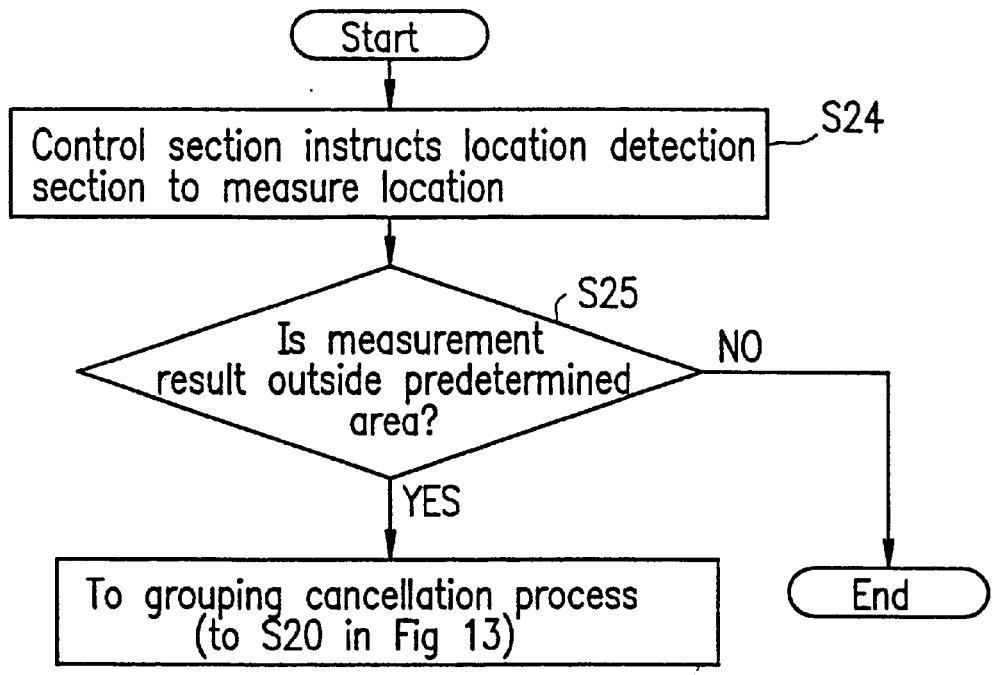
FIG. 14 is a flow chart illustrating a procedure of grouping registration cancellation based on location information according to Embodiment 2 of the present invention.

Referring to a flow chart illustrated in FIG. 14, the control section 9 instructs the location detection section 11 to detect the position of the apparatus (S24). Upon receiving the location information from the location detection section 11, the control section 9 extracts group information from the storage section 10 and searches for any apparatus which is outside the grouping area.

If there is no apparatus which is outside the grouping area (S25), the process is terminated. If there is any apparatus which is outside the grouping area (S25), the process proceeds to the grouping cancellation process shown at S20 in FIG. 13 so as to cancel the grouping.

Next, a case where grouping is canceled based on a time out will be described.

Figure 15:
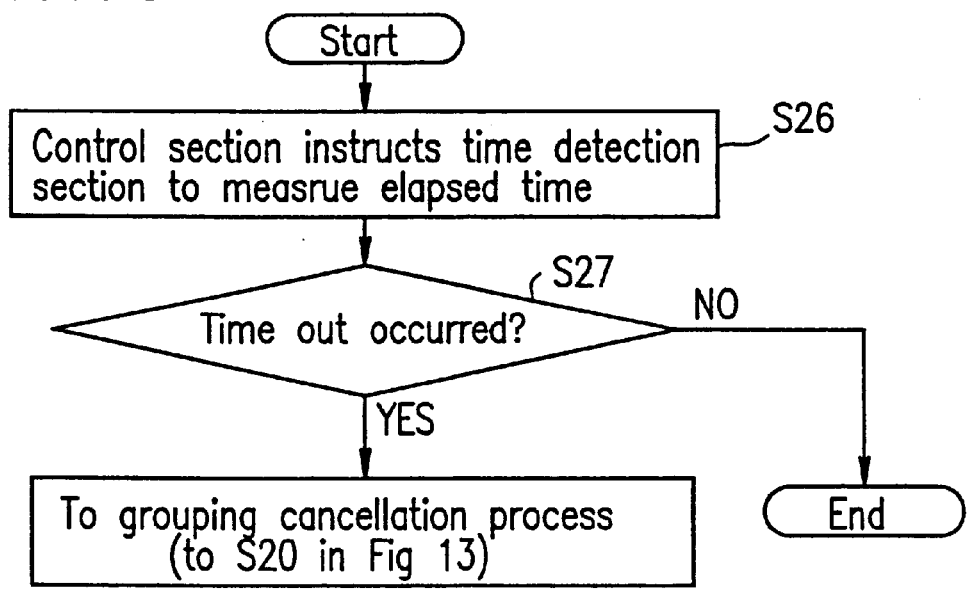
FIG. 15 is a flow chart illustrating a procedure of grouping registration cancellation based on elapsed time according to Embodiment 2 of the present invention.

Referring to a flow chart illustrated in FIG. 15, the control section 9 instructs the time detection section 12 to measure the elapsed time (S26). Upon receiving the elapsed time information from the time detection section 12, the control section 9 extracts the group information from the storage section 10 and searches for any apparatus for which a time out has occurred.

If there is no apparatus for which a time out has occurred (S27), the process is terminated. If there is any apparatus for which a time out has occurred (S27), the process proceeds to the grouping cancellation process shown at S20 in FIG. 13 so as to cancel the grouping.

Next, a case where grouping is canceled based on the number of connection times will be described.

Figure 16:
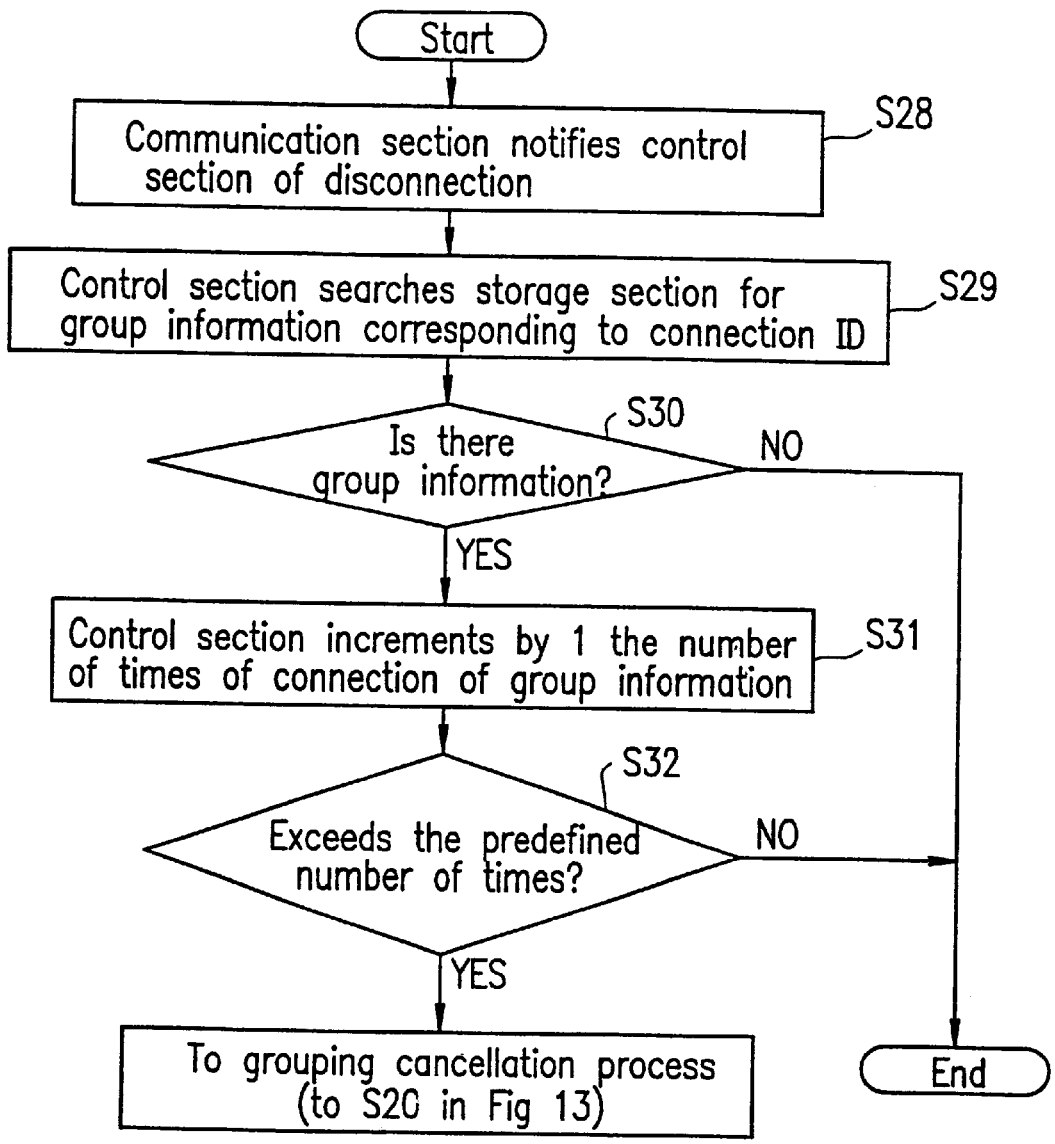
FIG. 16 is a flow chart illustrating a procedure of grouping registration cancellation based on the number of connection times according to Embodiment 2 of the present invention.

Referring to a flow chart illustrated in FIG. 16, when the apparatus is disconnected, the communication section 8 notifies the control section 9 of the disconnection (S28), and the control section 9 searches the storage section 10 for group information corresponding to the connection ID (S29).

If there is no group information corresponding to the connection ID (S30), the process is terminated. If there is group information corresponding to the connection ID (S30), the control section 9 counts up the number of connection times for the group information (S31) so as to determine whether the number of connection times exceeds the predefined number of times. If the number of connection times does not exceed the predefined number of times (S32), the process is terminated. If the number of connection times exceeds the predefined number of times (S32), the process proceeds to the grouping cancellation process shown at S20 in FIG. 13 so as to cancel the grouping.

The apparatus having a communication function of the present embodiment can also be canceled from grouping registration via a registration cancellation by another apparatus in communication with the user's apparatus in the following manner, for example.

Figure 17:
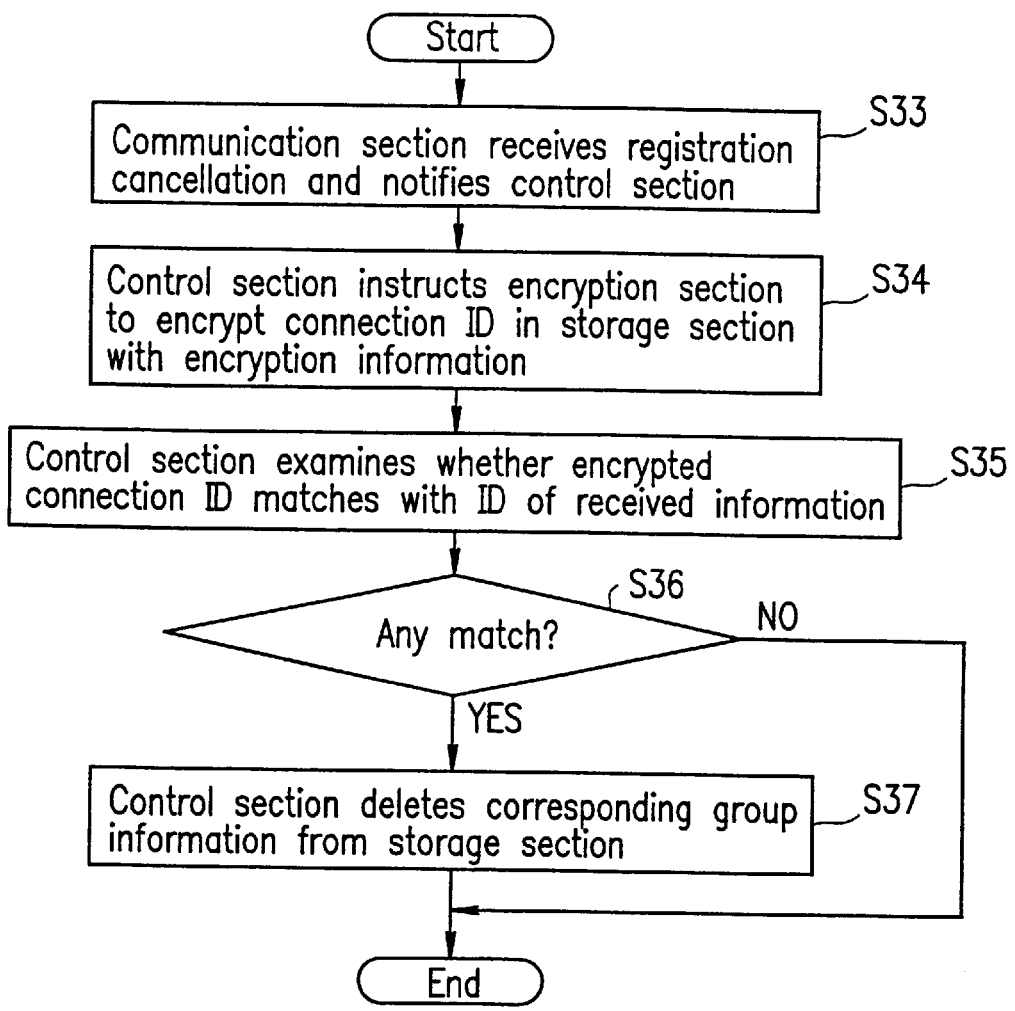
FIG. 17 is a flow chart illustrating a procedure of grouping registration cancellation based on receiving a registration cancellation from the partner according to Embodiment 2 of the present invention.

Referring to a flow chart illustrated in FIG. 17, when the communication section 8 receives registration cancellation from another apparatus, the communication section 8 notifies the control section 9 of the registration cancellation (S33). Upon notification, the control section 9 extracts encryption information from the received information and instructs the encryption section 13 to encrypt the connection ID stored in the storage section 10 (S34). The control section 9 examines whether or not the encrypted connection ID of the user's apparatus matches with the encrypted connection ID of the received information (S35).

If there is no connection ID match (S36), the process is terminated. If there is any connection ID match (S36), the control section 9 deletes group information corresponding to the connection ID from the storage section 10 (S37), and the grouping cancellation is terminated.

Moreover, the apparatus having a communication function of the present embodiment can cancel grouping by turning OFF the power supply in the following manner, for example.

Figure 18:
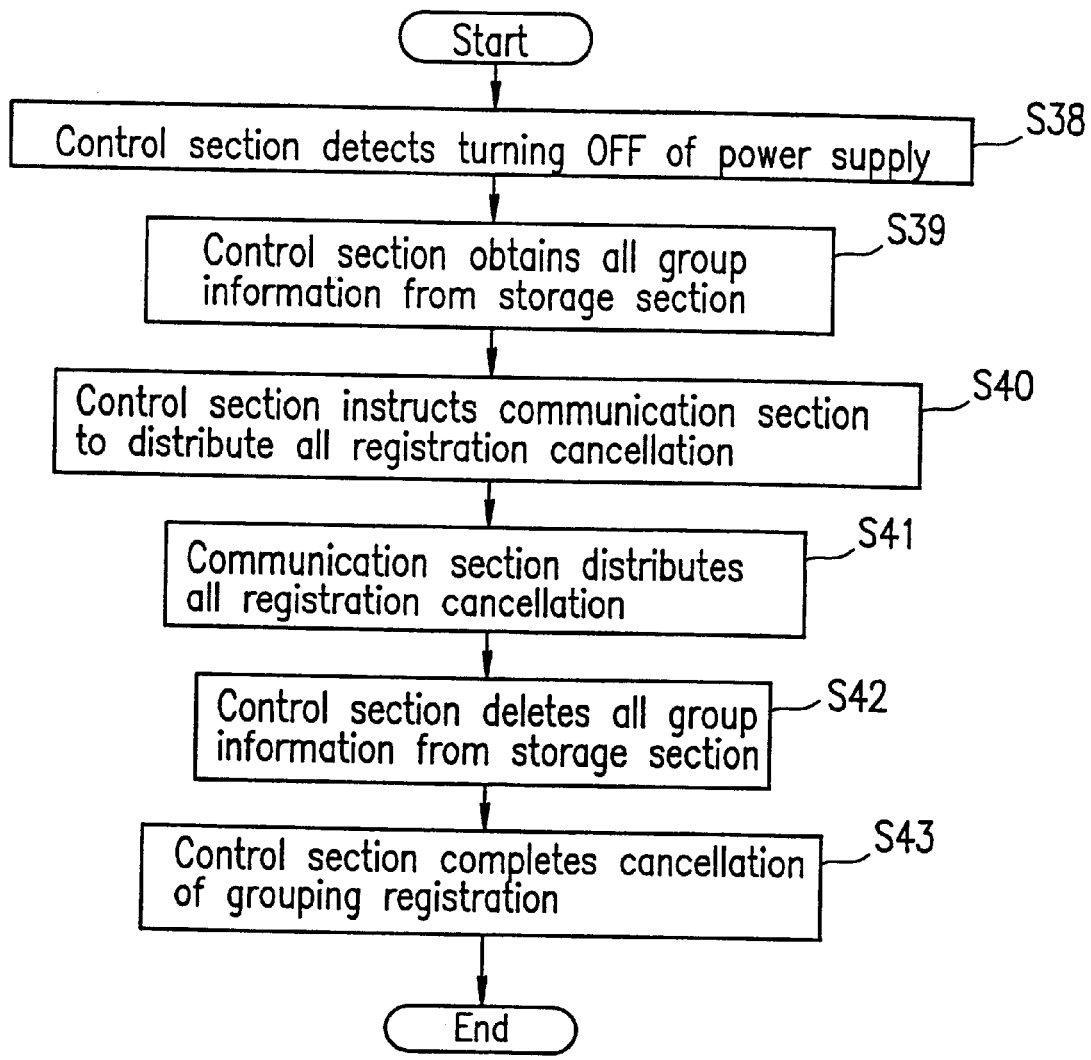
FIG. 18 is a flow chart illustrating a procedure of grouping registration cancellation based on turning OFF of power supply according to Embodiment 2 of the present invention.

Referring to a flow chart illustrated in FIG. 18, when the control section 9 detects turning OFF of the power supply (S38), the control section 9 extracts all the group information from the storage section 10 (S39), and instructs the communication section 8 to distribute registration cancellation information for every group information (S40). Then, the communication section 8 distributes registration cancellation based on the encrypted connection ID in the group information (S41). The control section 9 deletes all the group information from the storage section 10 (S42), and completes the grouping cancellation (S43).

(Embodiment 3)

Figure 3:
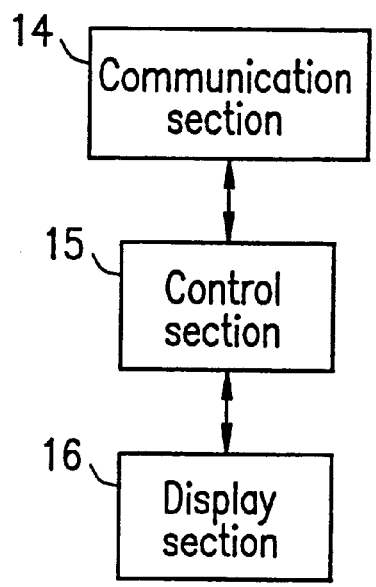
FIG. 3 is a block diagram illustrating a configuration of an apparatus for selecting one or more apparatuses to be grouped from a list of apparatuses according to Embodiment 3 of the present invention.

FIG. 3 is a block diagram illustrating a configuration of an apparatus having a communication function according to this embodiment.

The apparatus having a communication function includes a communication section 14, a control section 15 and a display section 16.

The communication section 14 communicates with another apparatus having a communication function. The control section 15 manages and controls the various sections. The display section 16 includes a display, a liquid crystal panel, or the like. The display section 16 displays a list of apparatuses with which the user's apparatus can be grouped. The user has a choice of which one or more of the listed apparatuses will be grouped with the user's apparatus.

With the apparatus having a communication function of the present embodiment having such a configuration, it is possible to specify the partner(s) to be grouped with the apparatus in the following manner, for example.

Figure 19:
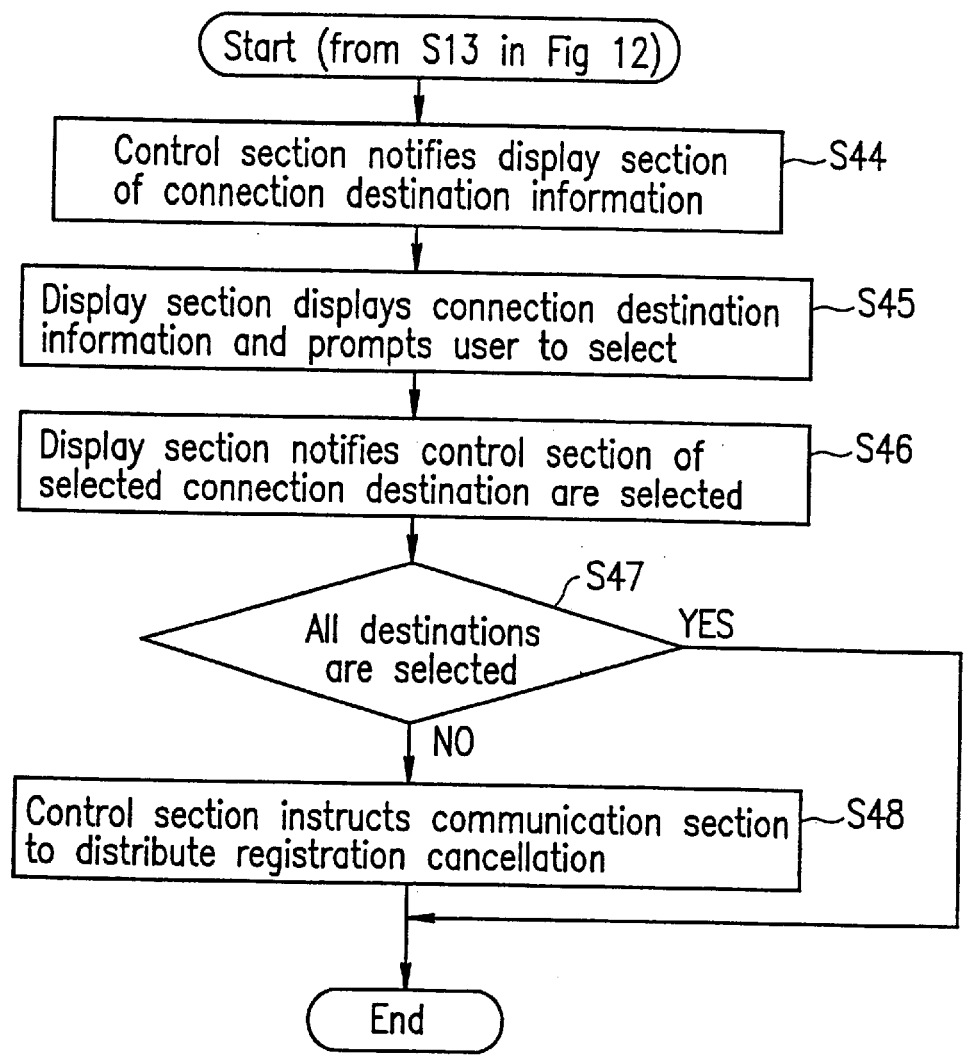
FIG. 19 is a flow chart illustrating a procedure of selecting apparatuses to be grouped using a list of apparatuses according to Embodiment 3 of the present invention.

Referring to a flow chart illustrated in FIG. 19, in the state of S13 in FIG. 12 where connection information is stored in the storage section, the control section 15 notifies the display section 16 of the connection partner information (S44), and the display section 16 displays the connection partner information and prompts the user to select the partner(s) that the user wishes to be grouped with (S45). The selection can be made by prompting the user to select from the list of partners displayed on a liquid crystal panel, for example, only the partner(s) that the user wishes to be grouped with. The display section 16 notifies the control section 15 of information of the connection partner(s) which has been selected by the user (S46).

When all of the partners are selected (S47), the process is terminated. When there is any unselected partner (S47), the control section 15 instructs the communication section 14 to distribute registration cancellation based on the encrypted connection ID corresponding to the unselected partner (S48), and terminates the process to return to S13 in FIG. 12.

(Embodiment 4)

Figure 4:
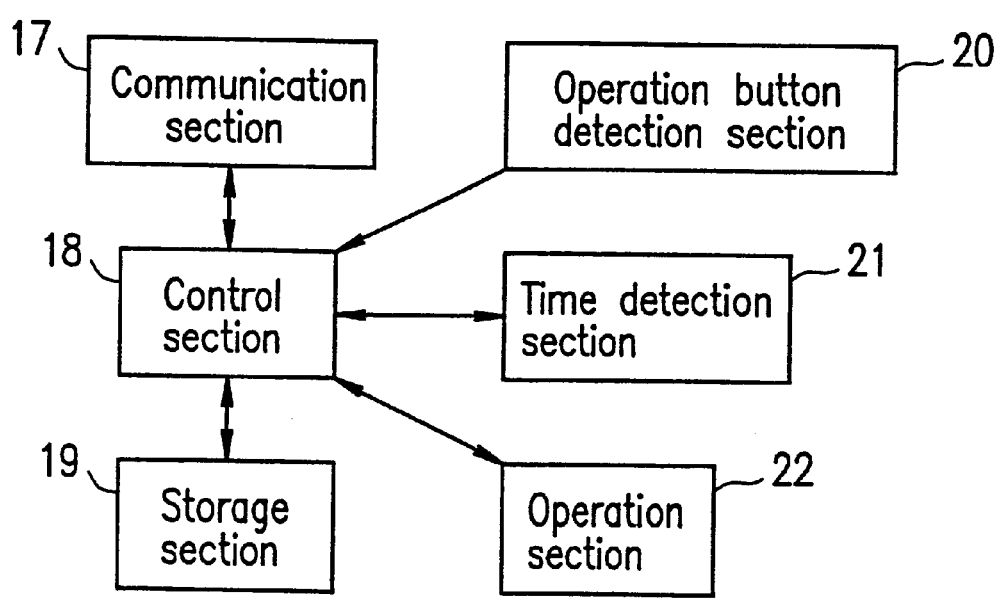
FIG. 4 is a block diagram illustrating a configuration of an apparatus for performing an interconnection operation according to Embodiment 4 of the present invention.

FIG. 4 is a block diagram illustrating an apparatus having a communication function of the present embodiment.

The apparatus having a communication function includes a communication section 17, a control section 18, a storage section 19, an operation button detection section 20, a time detection section 21, and an operation section 22.

The communication section 17 communicates with another apparatus having a communication function. The control section 18 manages and controls the various sections. The storage section 19 stores group information. The operation button detection section 20 includes a push button, a jog dial, or the like. The operation button detection section 20 notifies the control section 18 of an operation of an operation button. The time detection section 21 measures a time in response to an instruction from the control section 18. If a time out occurs, the time detection section 21 notifies the control section 18 of the time out. The operation section 22 serves as an interface of the control section 18 with sections other than a communication function section.

With the apparatus having a communication function of the present embodiment having such a configuration, it is possible to perform an interconnection operation registration in the following manner, for example.

Figure 20:
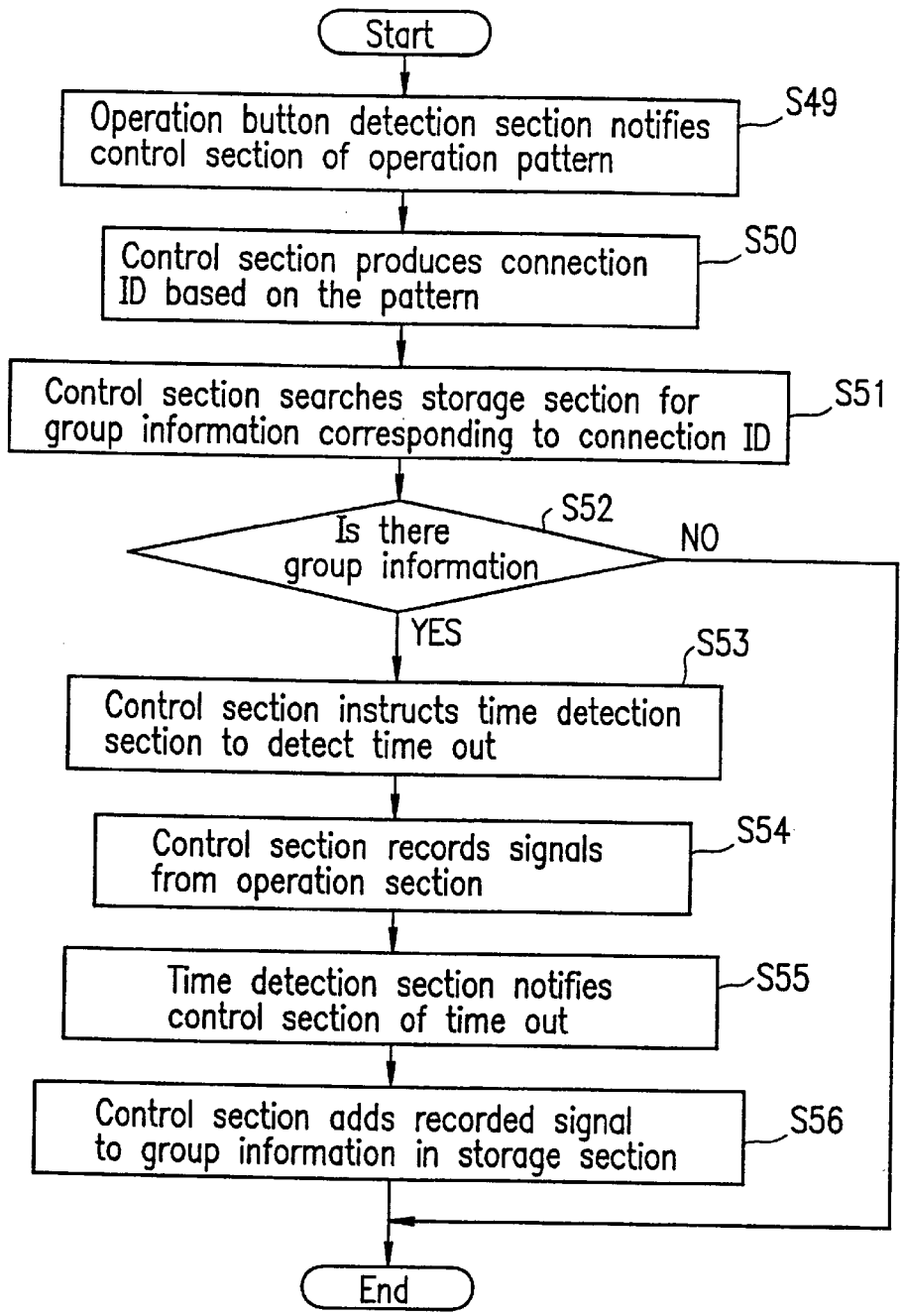
FIG. 20 is a flow chart illustrating a procedure of interconnection operation registration according to Embodiment 4 of the present invention.

Referring to a flow chart illustrated in FIG. 20, the user depresses an operation button of the apparatus having a communication function at one or more certain timings. In response to this, the operation button detection section 20 notifies the control section 18 of the number of times of depression and the timing(s) of depression (i.e., an operation pattern) (S49).

Upon receiving the operation pattern, the control section 18 generates a connection ID based on the operation pattern (S50), and searches for group information corresponding to the generated connection ID (S51).

If there is no group information corresponding to the generated connection ID (S52), the process is terminated. If there is group information corresponding to the generated connection ID (S52), the control section 18 instructs time detection section 21 to detect a time out (S53), and records signals from the operation section 22 (S54). When the time detection section 21 notifies the control section 18 of the time out (S55), the control section 18 adds the recorded signals to the group information in the storage section 19 (S56).

With the apparatus having a communication function of the present embodiment having such a configuration, it is possible to perform an interconnection operation automatic registration in the following manner, for example.

Figure 21:
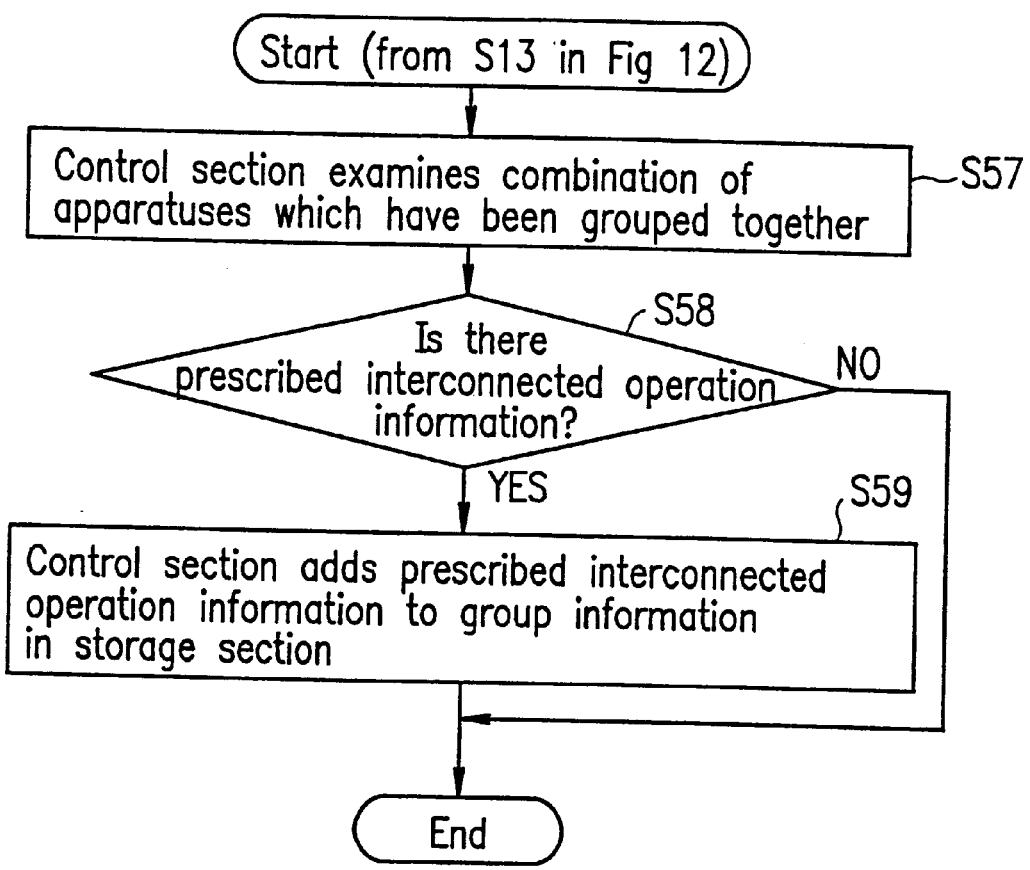
FIG. 21 is a flow chart illustrating a procedure of interconnection operation automatic registration according to Embodiment 4 of the present invention.

Referring to a flow chart illustrated in FIG. 21, after S13 of FIG. 12 (after successful grouping), the control section 18 examines the combination of apparatuses which have been grouped together (S57), and examines whether or not the combination matches the preset interconnection operation information. If there is no match (S58), the process is terminated. If there is a match (S58), the control section 18 adds the preset interconnection operation information to the group information in the storage section 19 (S59). The preset interconnection operation information is typically stored in the storage section. However, where the control section includes a control program, a CPU, and the like, the preset interconnection operation information can be buried as data in the control program.

Then, the apparatus having a communication function of the present embodiment can distribute the interconnection operation in the following manner, for example.

Figure 22:
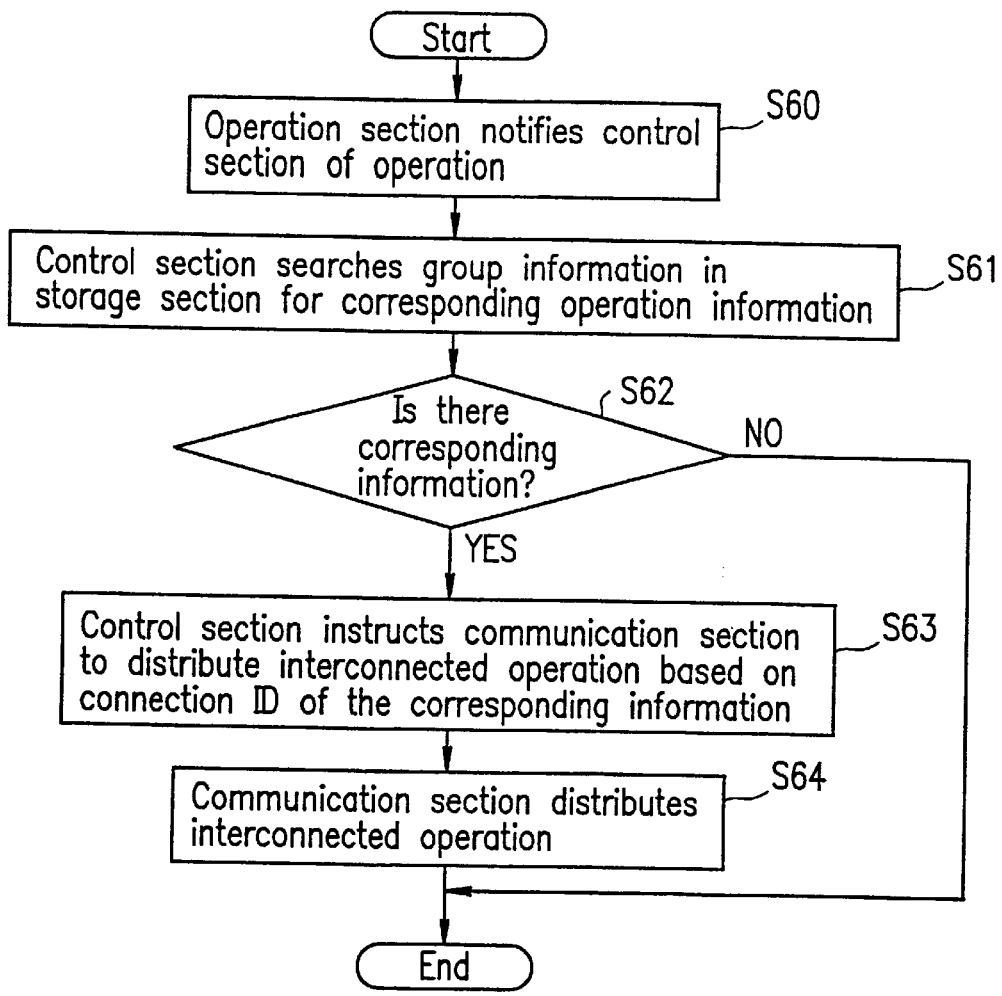
FIG. 22 is a flow chart illustrating a procedure of interconnection operation distribution according to Embodiment 4 of the present invention.

Referring to a flow chart illustrated in FIG. 22, when the operation section 22 notifies the control section 18 of an operation (S60), the control section 18 searches the group information in the storage section 19 for the corresponding operation information (S61).

If there is no corresponding operation information (S62), the process is terminated. If there is such corresponding operation information (S62), the control section 18 instructs the encryption section to encrypt the connection ID of the corresponding information. The control section 18 instructs the communication section 17 to distribute the interconnection operation information based on the encrypted connection ID (S63), and the communication section 17 distributes the interconnection operation information.

With the apparatus having a communication function of the present embodiment having such a configuration, it is possible to receive an interconnection operation in the following manner, for example.

Figure 23:
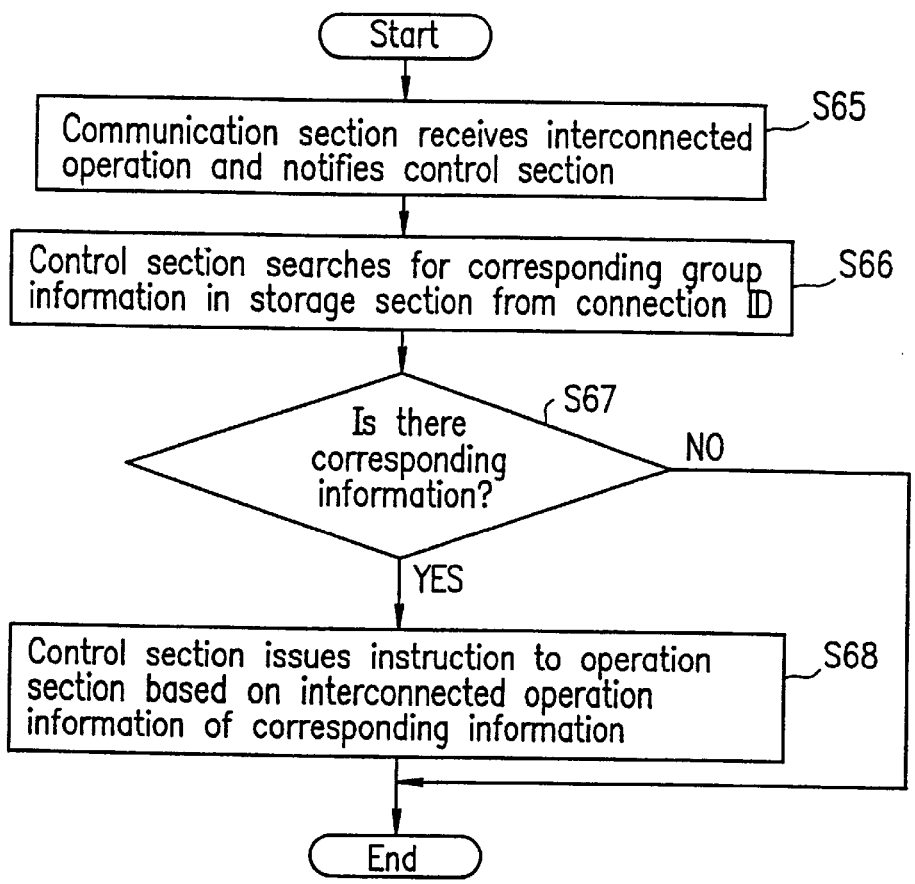
FIG. 23 is a flow chart illustrating a procedure of interconnection operation reception according to Embodiment 4 of the present invention.

Referring to a flow chart illustrated in FIG. 23, upon receiving the interconnection operation, the communication section 17 notifies the control section 18 of reception of the interconnection operation information (S65). The control section 18 instructs the storage section 19 to encrypt, based on the received encryption information, the connection ID of the group information stored in the storage section 19 so as to examine whether or not there is any encrypted connection ID information which matches the received and encrypted connection ID (S66).

If there is no connection ID match (S67), the process is terminated. If there is any connection ID match (S67), the control section 18 instructs the operation section 22 based on the corresponding interconnection operation information (S68).

(Embodiment 5)

Figure 5:
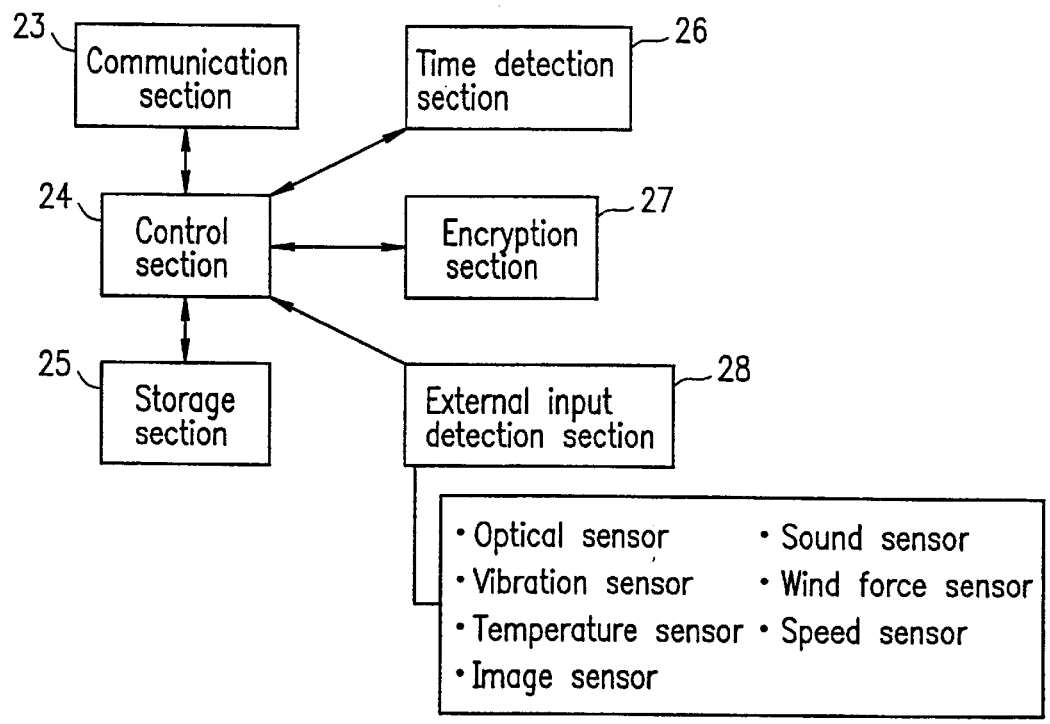
FIG. 5 is a block diagram illustrating a configuration of an apparatus for inputting other external information according to Embodiment 5 of the present invention.

FIG. 5 is a block diagram illustrating an apparatus having a communication function of the present embodiment.

The apparatus having a communication function includes a communication section 23, a control section 24, a storage section 25, a time detection section 26, an encryption section 27, and an external input detection section 28.

The communication section 23 communicates with another apparatus having a communication function. The control section 24 manages and controls the various sections. The storage section 25 stores group information. The time detection section 26 measures a time in response to an instruction from the control section 24. If a time out occurs, the time detection section 26 notifies the control section 24 of the time out. The encryption section 27 encrypts information as instructed by the control section 24. The external input detection section 28 includes various sensors, a control device for such sensors, and the like. Instead of a button operation performed by the user, various sensors can be used such as an optical sensor, a sound sensor, a vibration sensor, a wind force sensor, a temperature sensor, a speed sensor, an image sensor, and the like.

With the apparatus having a communication function of the present embodiment having such a configuration, it is possible to receive an external input in the following manner, for example.

Figure 24:
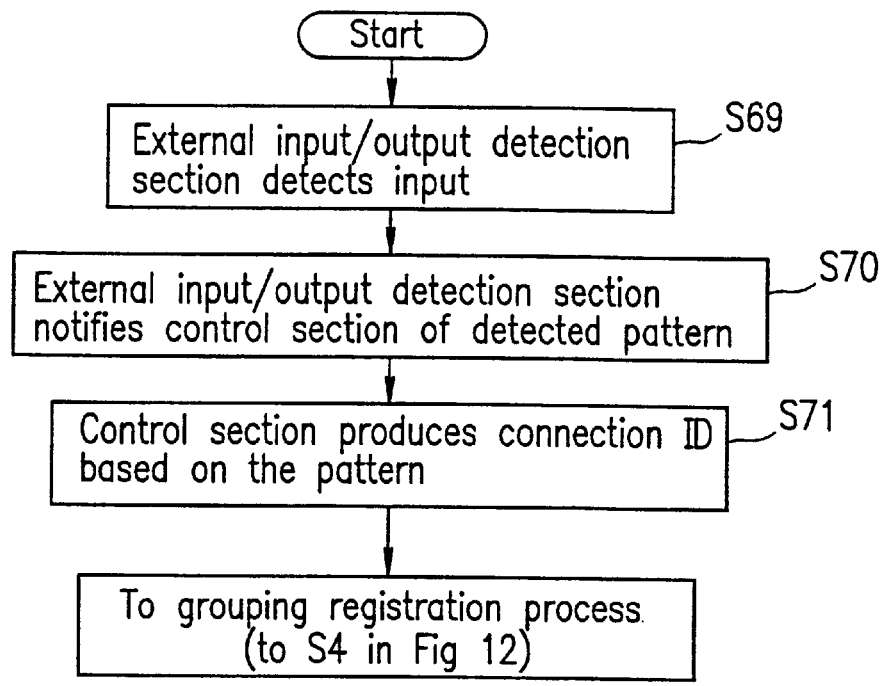
FIG. 24 is a flow chart illustrating a procedure of grouping registration based on external input detection according to Embodiment 5 of the present invention.

Referring to a flow chart illustrated in FIG. 24, when the external input detection section 28 detects an external input (S69), the external input detection section 28 notifies the control section 24 of the detected pattern (S70). The control section 24 generates a connection ID from the received pattern (S71). Then, the process proceeds to the grouping process shown at S4 in FIG. 12, a grouping cancellation process shown at S20 in FIG. 13, etc.

(Embodiment 6)

Figure 6:
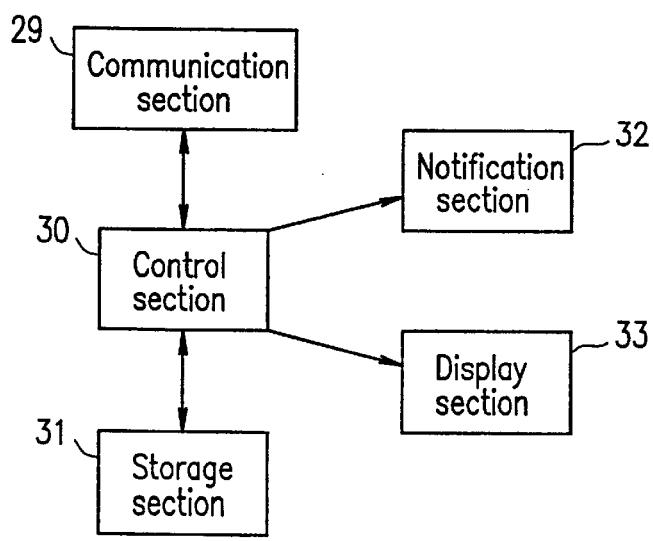
FIG. 6 is a block diagram illustrating a configuration of an apparatus for notification of successful grouping operation according to Embodiment 6 of the present invention.

FIG. 6 is a block diagram illustrating an apparatus having a communication function of the present embodiment.

The apparatus having a communication function includes a communication section 29, a control section 30, a storage section 31. The apparatus having a communication function further includes at least one of a notification section 32 and a display section 33.

The communication section 29 communicates with another apparatus having a communication function. The control section 30 manages and controls the various sections. The storage section 31 stores group information. The notification section 32 notifies the user of a successful grouping registration, etc., by means of a buzzer, an LED lamp, or the like. The display section 33 notifies the user of a successful grouping registration, etc., by means of a display panel, or the like.

The apparatus having a communication function of the present embodiment having such a configuration can be operated in the following manner, for example.

Figure 25:
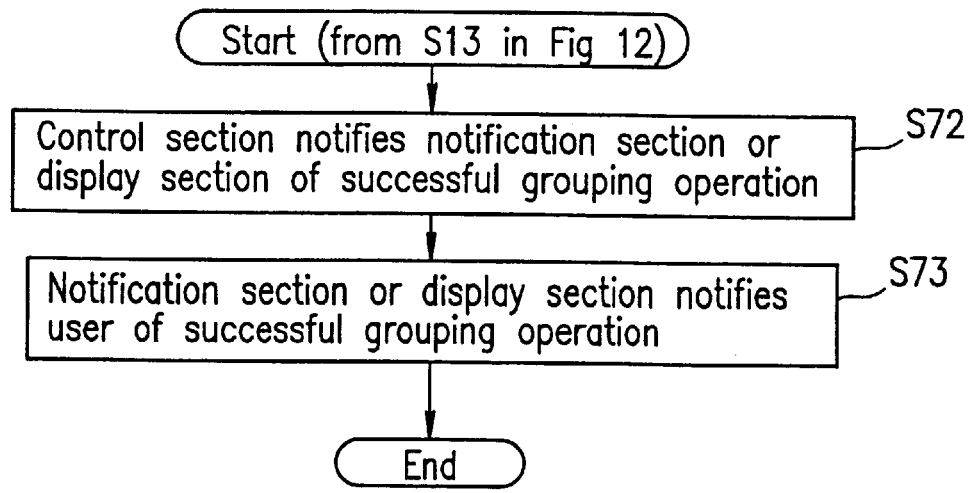
FIG. 25 is a flow chart illustrating a procedure of notification of successful grouping operation according to Embodiment 6 of the present invention.

Referring to a flow chart illustrated in FIG. 25, when a grouping operation succeeds (S13 in FIG. 12), the control section 30 notifies the notification section 32 or the display section 33 of the successful grouping operation (S72). Upon receiving the notification, the notification section 32 or the display section 33 notifies the user of the successful group operation by means of a buzzer, an LED lamp, a display panel, or the like (S73).

(Embodiment 7)

Figure 7:
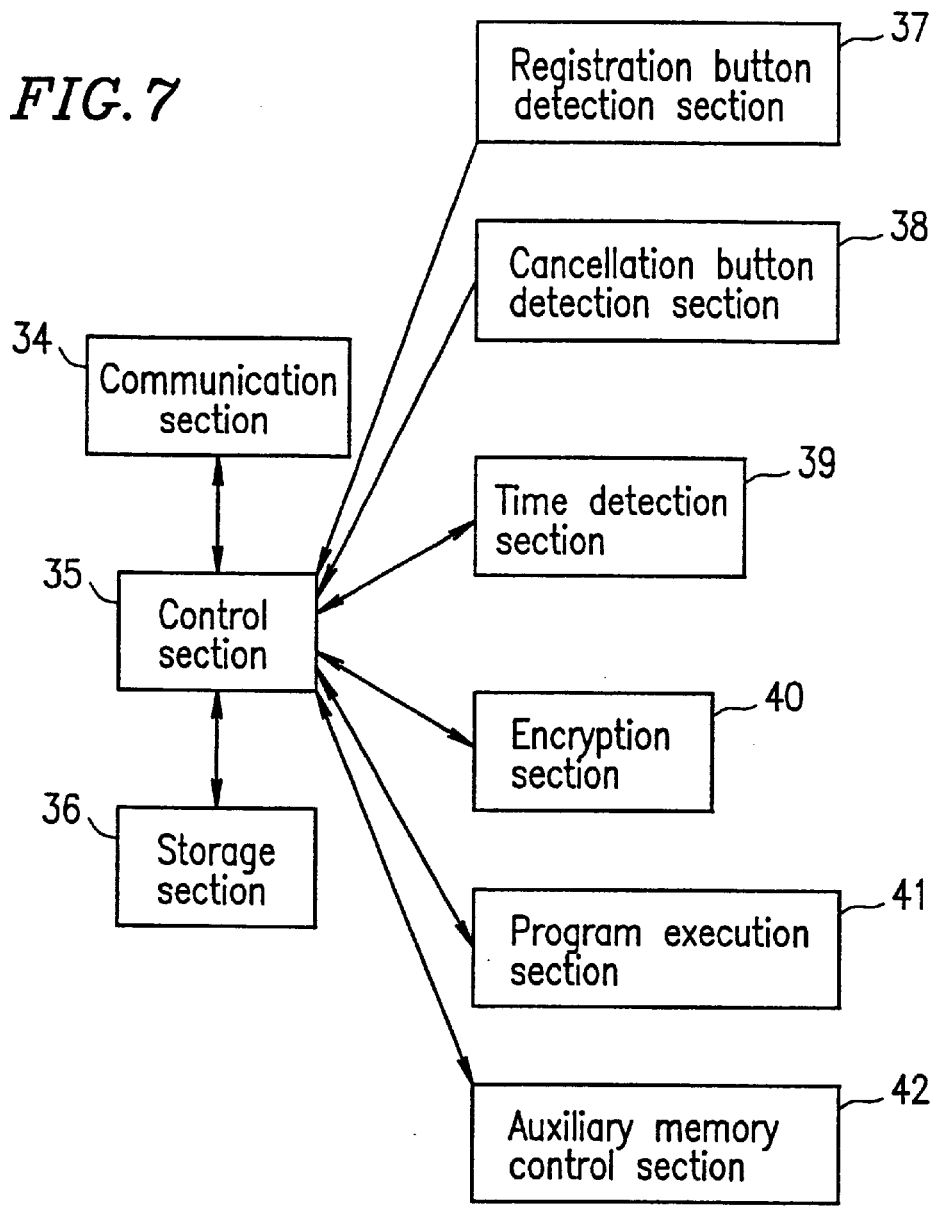
FIG. 7 is a block diagram illustrating a configuration of an apparatus having a communication function according to Embodiment 7 of the present invention.

FIG. 7 is a block diagram illustrating an apparatus having a communication function of the present embodiment.

The apparatus having a communication function includes a communication section 34, a control section 35, a storage section 36, a registration button detection section 37, a cancellation button detection section 38, a time detection section 39, an encryption section 40, a program execution section 41, and an auxiliary memory control section 42.

The communication section 34 communicates with another apparatus having a communication function. The control section 35 has a function of generating a connection ID which is required for a grouping operation based on signals from the registration button detection section 37 and the cancellation button detection section 38. The control section 35 also has a function of reading a program from the auxiliary memory control section 42 and instructing the program execution section 41 to execute the program. Moreover, the control section 35 manages and controls the various sections. The storage section 36 stores group information. The registration button detection section 37 notifies the control section 35 of an operation of the registration button, and the cancellation button detection section 38 notifies the control section 35 of an operation of the cancellation button. The time detection section 39 measures a time in response to an instruction from the control section 35. If a time out occurs, the time detection section 39 notifies the control section 35 of the time out. The encryption section 40 encrypts information as instructed by the control section 35. The program execution section 41 includes an encryption program and a CPU, or the like, for executing the encryption program. The auxiliary memory control section 42 is a medium for recording a program, and includes a tape, (e.g., a magnetic tape), a magnetic disk (e.g., a floppy disk, and a hard disk), an optical disk (e.g., a CD-ROM, an MO, an MD, a DVD), a card (e.g., an IC card), a semiconductor memory (e.g., a mask ROM, an EPROM, a flash ROM), etc.

In the apparatus having a communication function of the present embodiment having such a configuration, the control section 35 including a microprocessor, or the like, controls the auxiliary memory control section 42 to download a program and install the program in the program execution section 41. The execution section 41 can then process the program. Alternatively, the program can be downloaded in advance. The method and procedure for controlling the other sections may be similar to those of the apparatus having a communication function illustrated in FIG. 1.

(Embodiment 8)

In this embodiment, an application of the present invention will be described with reference to a block diagram illustrated in FIG. 8.

Figure 8:
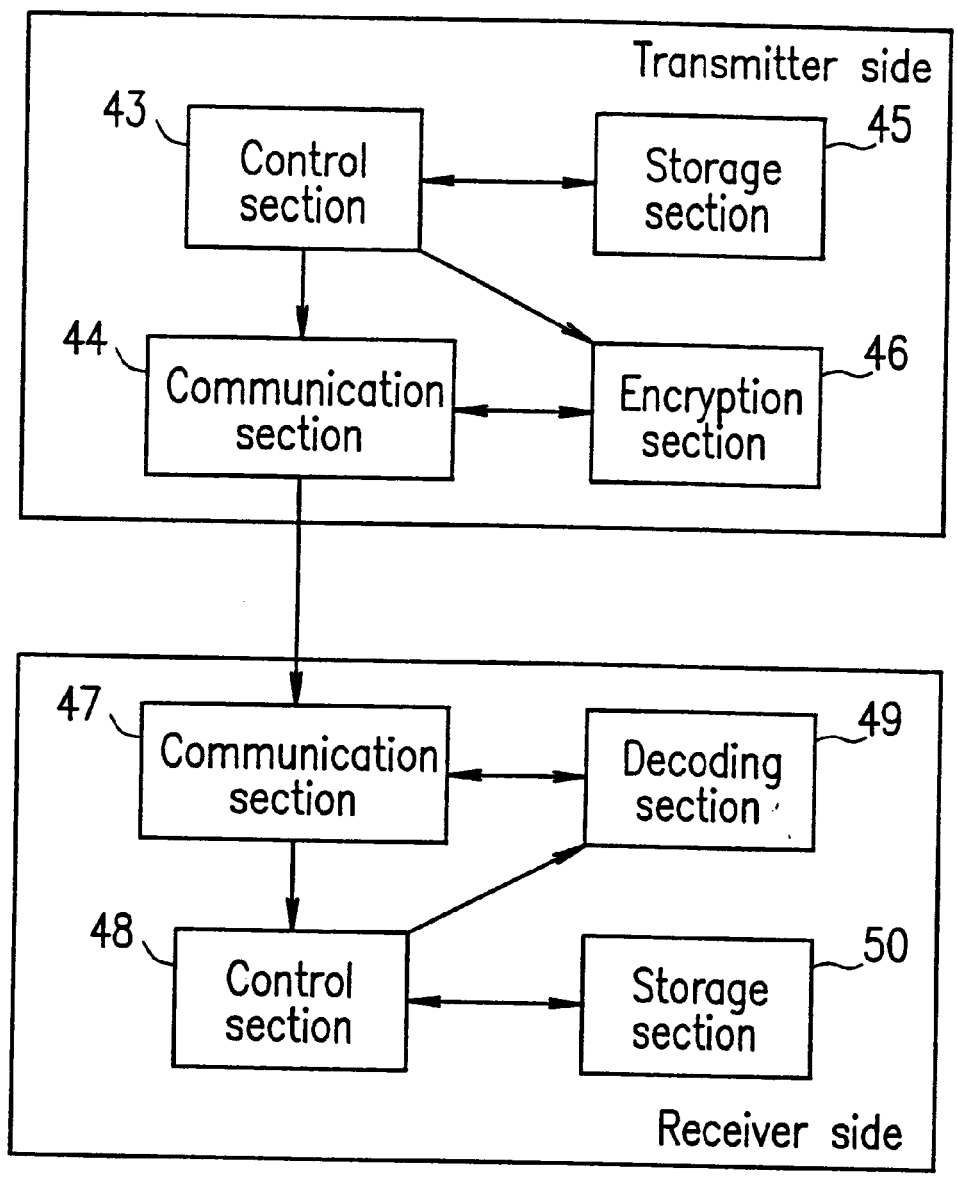
FIG. 8 is a block diagram illustrating a configuration of an apparatus for performing an encrypted communication operation according to Embodiment 8 of the present invention.

Referring to FIG. 8, a transmitter-side apparatus having a communication function includes a control section 43, a communication section 44, a storage section 45, and an encryption section 46; and a receiver-side apparatus having a communication function includes a communication section 47, a control section 48, a decoding section 49 and a storage section 50.

In the transmitter-side apparatus having a communication function, the control section 43 manages and controls the various sections. The communication section 44 communicates with another apparatus having a communication function. The storage section 45 stores group information. The encryption section 46 encrypts information as instructed by the communication section 44 based on a connection ID obtained from the control section 43.

In the receiver-side apparatus having a communication function, the communication section 47 communicates with another apparatus having a communication function. The control section 48 manages and controls the various sections. The decoding section 49 decodes information as instructed by the communication section 47 based on the connection ID obtained from the control section 48. The storage section 50 stores group information.

An encrypted communication process by using a common key according to the present embodiment will now be described.

The transmitter-side apparatus having a communication function operates as follows.

Figure 26:
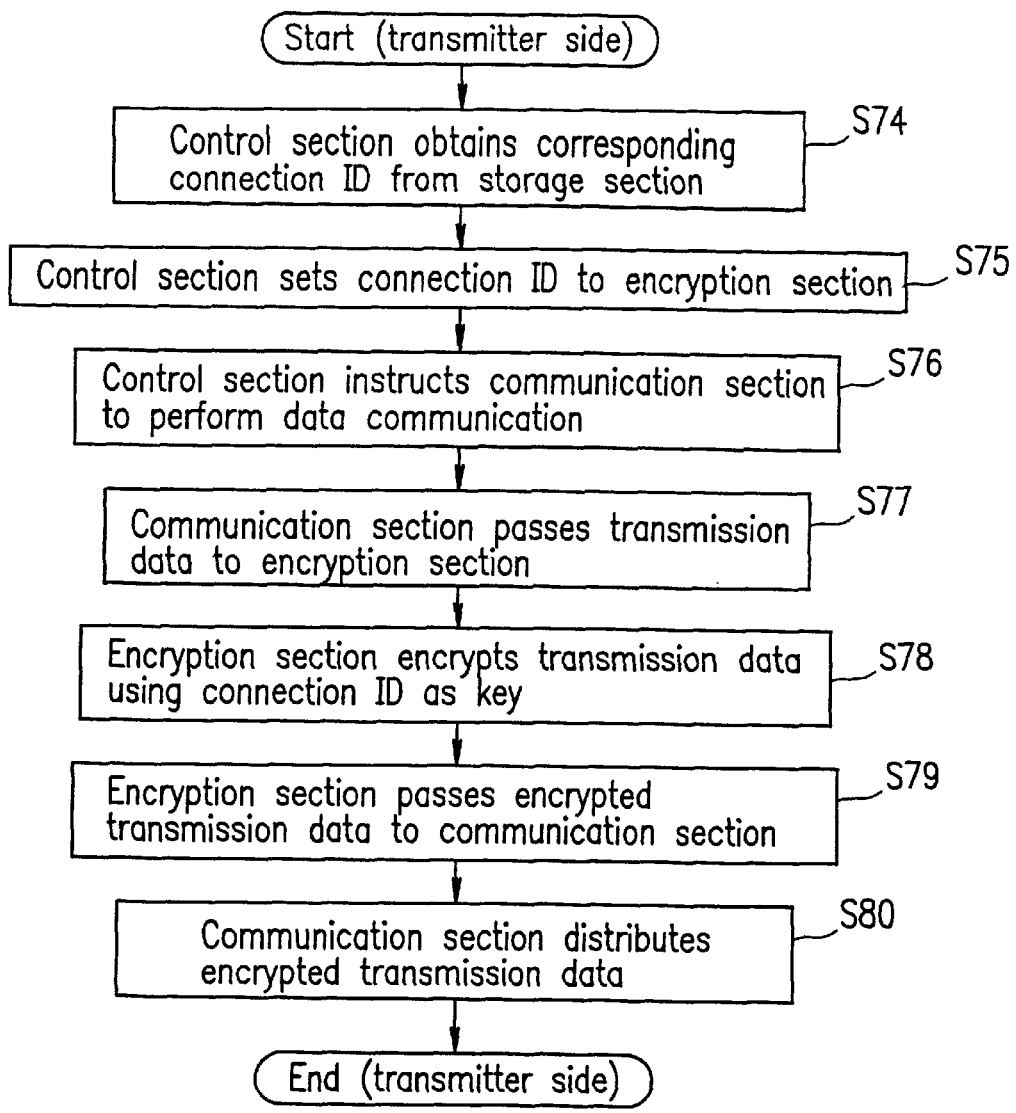
FIG. 26 is a flow chart illustrating a procedure of encrypted communication on the transmitter side according to Embodiment 8 of the present invention.

Referring to a flow chart illustrated in FIG. 26, in a data transmission operation, the control section 43 first searches the storage section 45 for the group information of the transmission partner and obtains a connection ID (S74). Next, the control section 43 sets a connection ID in the encryption section 46 (S75), and instructs the communication section 44 to transmit the data (S76). The communication section 44 passes the transmitted data to the encryption section 46 (S77). The encryption section 46 uses the set connection ID as a common key to encrypt the transmitted data so as to encrypt the transmitted data (S78). Then, the communication section 44 receives the transmitted data from the encryption section 46 (S79), and distributes the received data (S80).

The receiver-side apparatus having a communication function operates as follows.

Figure 27:
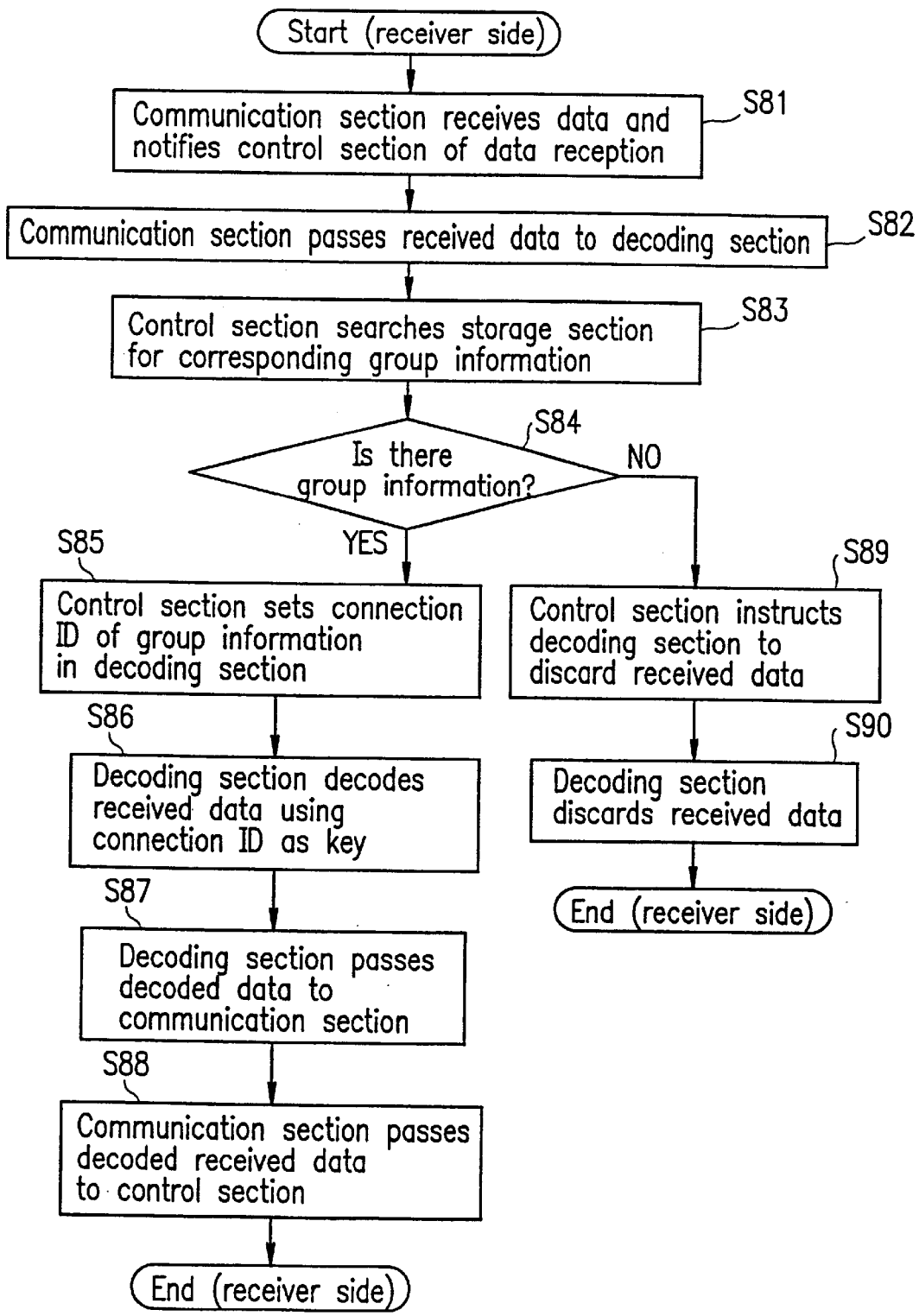
FIG. 27 is a flow chart illustrating a procedure of encrypted communication on the receiver side according to Embodiment 8 of the present invention.

Referring to a flow chart illustrated in FIG. 27, the communication section 47 receives data and notifies the control section 48 of the data reception (S81), and the encrypted received data is transferred to the decoding section 49 (S82). The control section 48 searches the storage section 50 for the corresponding group information.

If there is any corresponding group information (S84), the control section 48 obtains a connection ID and 10 sets the obtained connection ID in the decoding section 49 (S85). The decoding section 49 decodes the received data by using the set connection ID as a common key (S86), and passes the decoded received data to the communication section 47 (S87). The communication section 47 passes the decoded received data to control section 48 (S88), and terminates the process. If there is no corresponding group information (S84), the control section 48 instructs the decoding section 49 to discard the received data (S89), and the decoding section 49 discards the received data (S90).

(Embodiment 9)

In this embodiment, an application of the present invention will be described with reference to a block diagram illustrated in FIG. 9.

Figure 9:
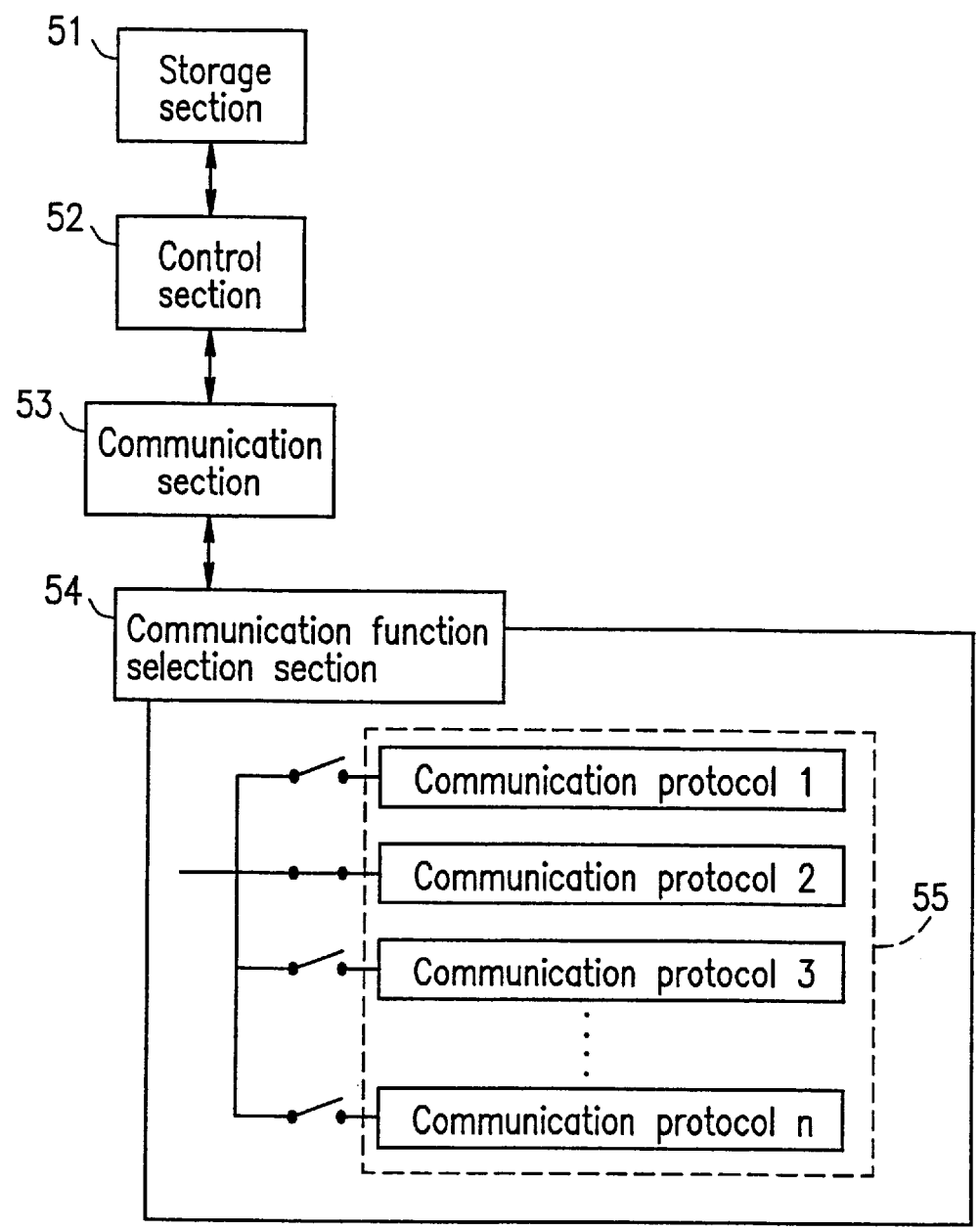
FIG. 9 is a block diagram illustrating a configuration of an apparatus for performing a communication operation while selecting a communication protocol according to Embodiment 9 of the present invention.

Referring to FIG. 9, the apparatus having a communication function includes a storage section 51, a control section 52, a communication section 53 and a communication function selection section 54.

The storage section 51 stores group information. The control section 52 manages and controls the various sections. The communication section 53 communicates with another apparatus having a communication function. The communication function selection section (communication protocol selection section) 54 selects a communication protocol to be used based on the connection ID. A group of communication protocols 55 includes a plurality of communication protocol modules (1, 2, . . . , n).

A communication operation using a communication protocol according to the present embodiment will now be described.

Figure 28:
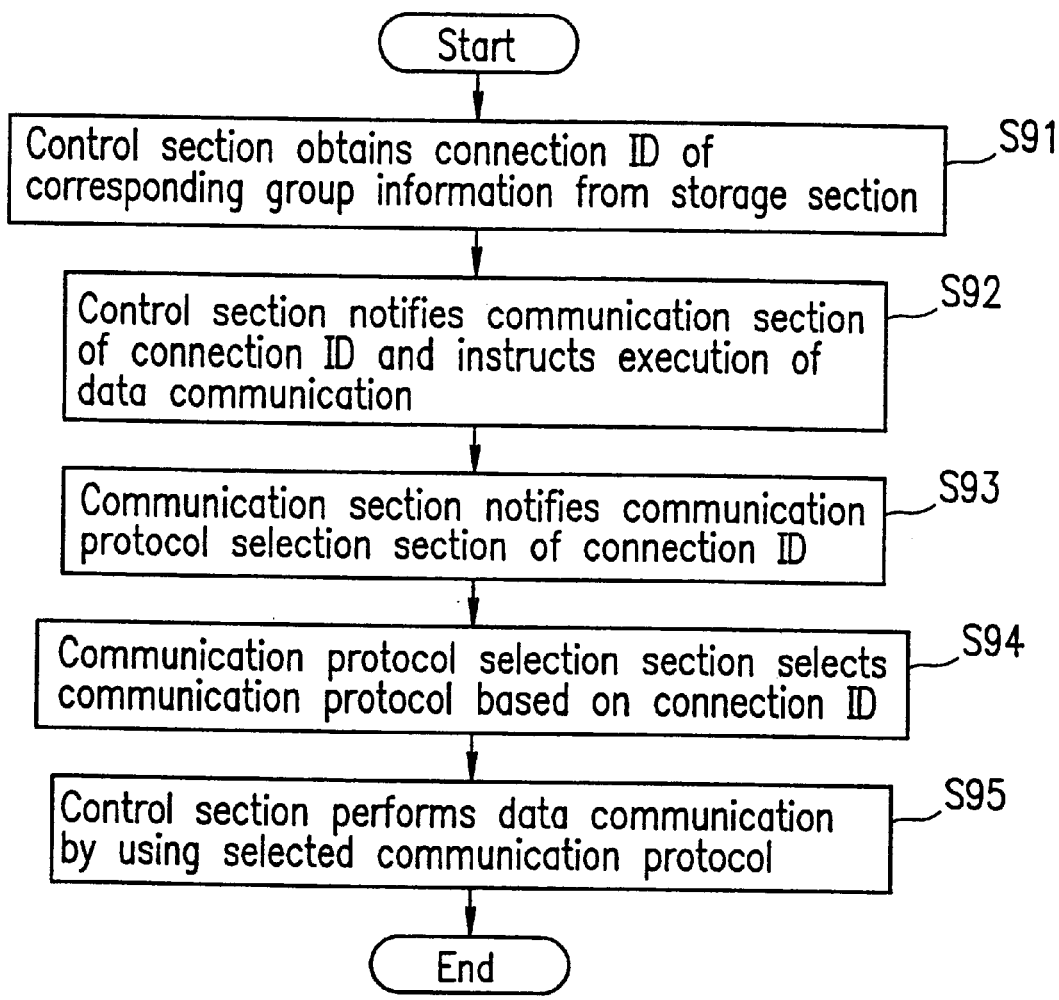
FIG. 28 is a flow chart illustrating a procedure of communication protocol selection according to Embodiment 9 of the present invention.

Referring to a flow chart illustrated in FIG. 28, in a data communication operation, the control section 52 first searches the storage section 51 for corresponding group information and obtains a connection ID (S91). Then, the control section 52 notifies the communication section 53 of the connection ID and instructs the communication section 53 to perform data communication (S92). The communication section 53 notifies the communication protocol selection section 54 of the connection ID (S93), and the communication protocol selection section 54 selects and sets a communication protocol to be used in the data communication operation based on the connection ID (S94). The communication section 53 performs a data communication operation based on the set communication protocol module (S95).

For the partner apparatus having a communication function, a communication protocol can be selected in a similar procedure. Thus, apparatuses for which the same communication protocol has been selected can communicate with each other.

(Embodiment 10)

In this embodiment, an application of the present invention will be described with reference to a block diagram illustrated in FIG. 10.

Figure 10:
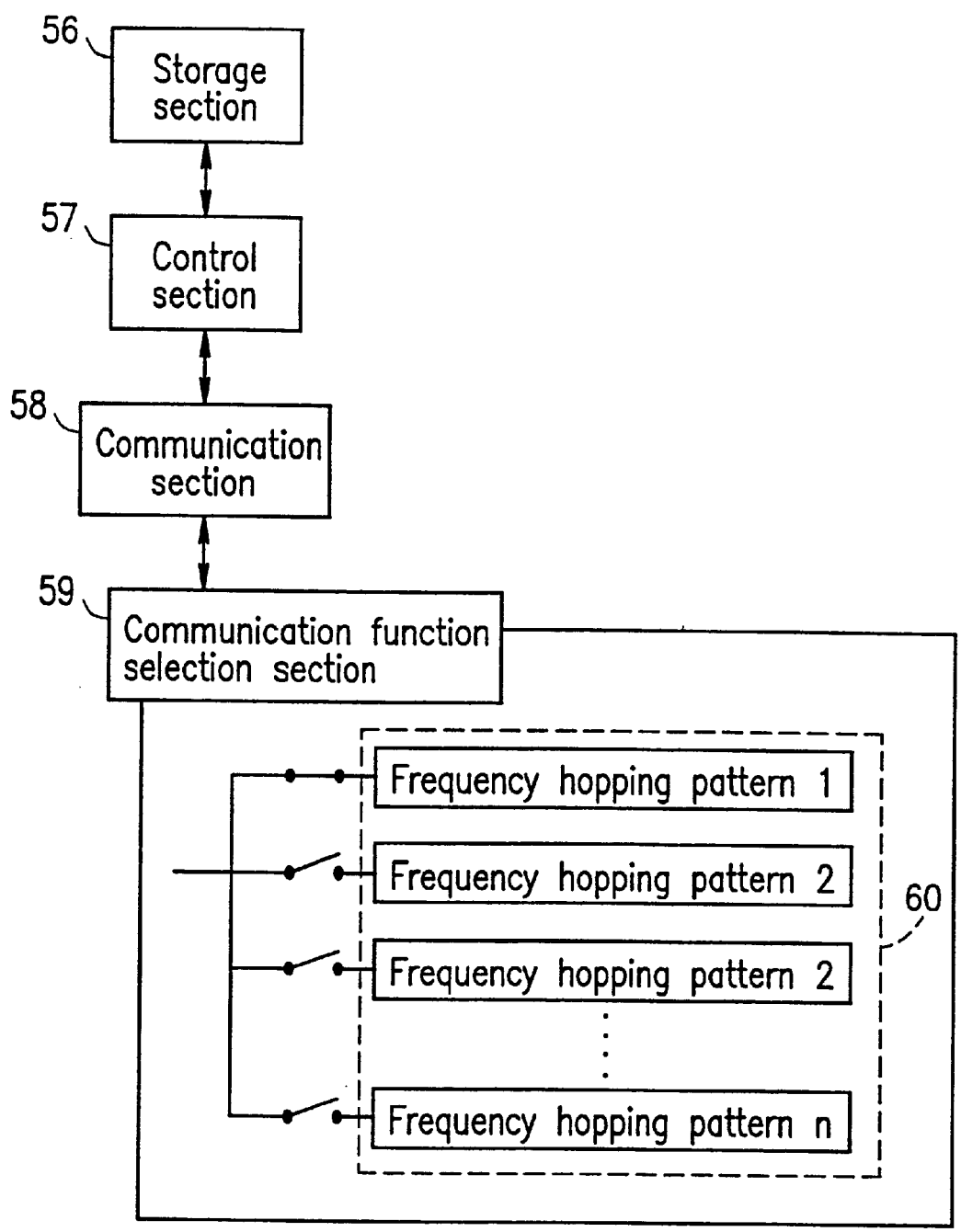
FIG. 10 is a block diagram illustrating a configuration of an apparatus for performing a communication operation while selecting a frequency hopping pattern according to Embodiment 10 of the present invention.

Referring to FIG. 10, the apparatus having a communication function includes a storage section 56, a control section 57, a communication section 58, and a communication function selection section 59.

The storage section 56 stores group information. The control section 57 manages and controls the various sections. The communication section 58 communicates with another apparatus having a communication function. The communication function selection section (pattern selection section) 59 selects a frequency hopping pattern to be used based on the connection ID. A group of frequency hopping patterns 60 includes a table containing a plurality of frequency hopping patterns (1, 2, . . . , n).

A communication operation using a frequency hopping pattern according to the present embodiment will now be described.

Figure 29:
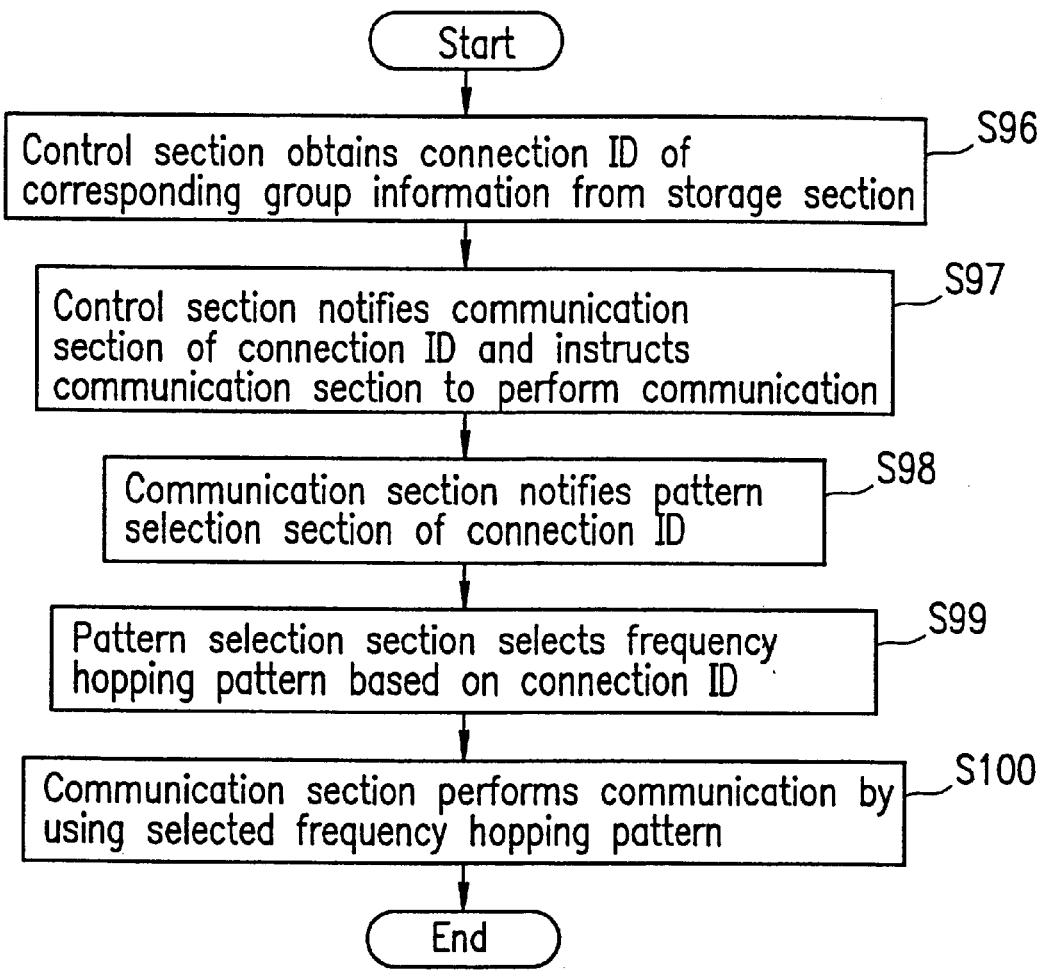
FIG. 29 is a flow chart illustrating a procedure of frequency hopping pattern selection according to Embodiment 10 of the present invention.

Referring to a flow chart illustrated in FIG. 29, in a data communication operation, the control section 57 first searches the storage section 56 for corresponding group information and obtains a connection ID (S96). Then, the control section 57 notifies the communication section 58 of the connection ID and instructs the communication section 58 to perform data communication (S97). The communication section 58 notifies the pattern selection section 59 of the connection ID (S98), and the pattern selection section 59 selects and sets a frequency hopping pattern to be used in the data communication operation based on the connection ID (S99). The communication section 58 performs a data communication operation based on the set frequency hopping pattern (S100).

For the partner apparatus having a communication function, a frequency hopping pattern can be selected in a similar procedure. Thus, apparatuses for which the same frequency hopping pattern has been selected can communicate with each other.

(Embodiment 11)

In this embodiment, an application of the present invention will be described with reference to a block diagram illustrated in FIG. 11.

Figure 11:
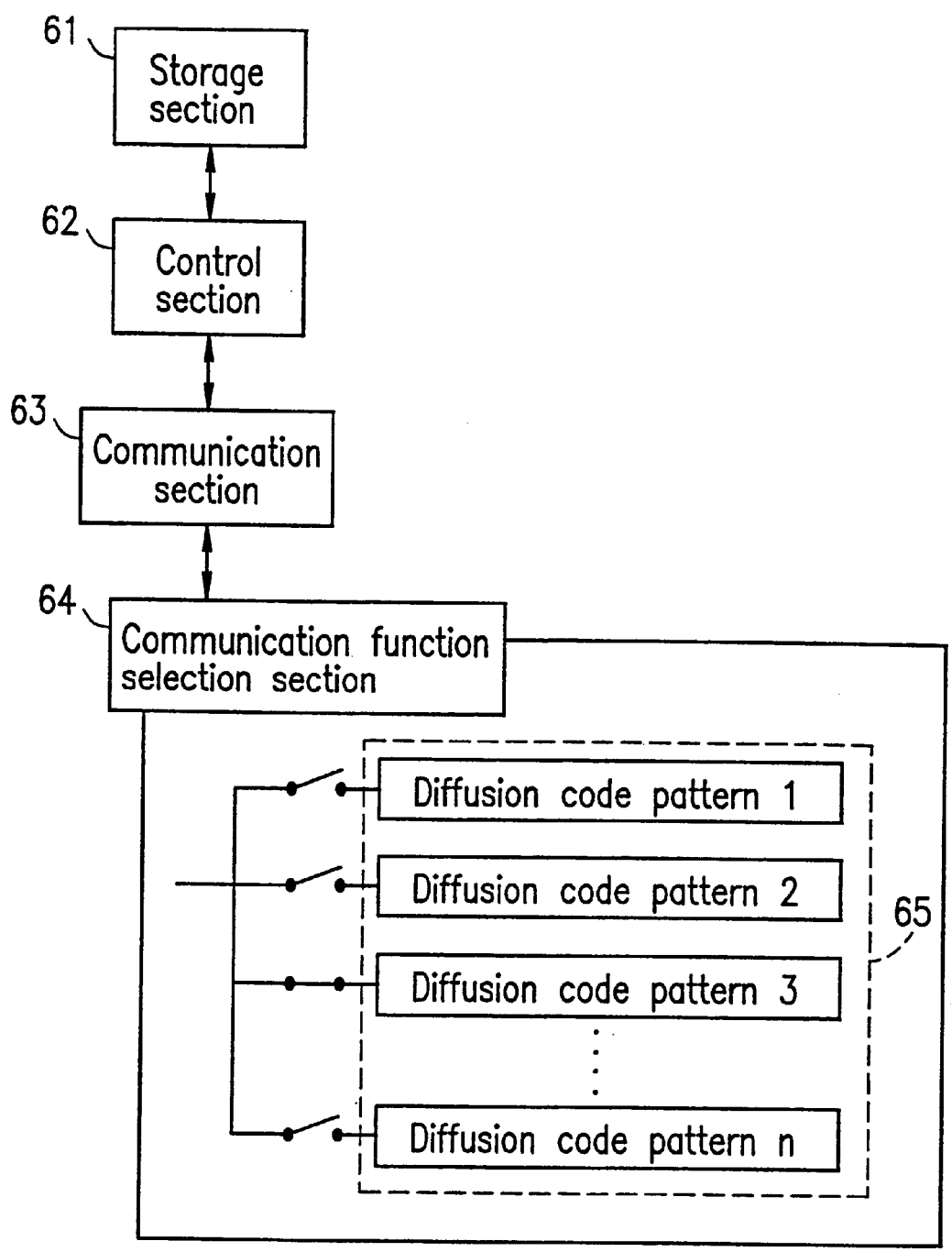
FIG. 11 is a block diagram illustrating a configuration of an apparatus for performing a communication operation while selecting a diffusion code pattern according to Embodiment 11 of the present invention.

Referring to FIG. 11, the apparatus having a communication function includes a storage section 61, a control section 62, a communication section 63, and a communication function selection section 64.

The storage section 61 stores group information. The control section 62 manages and controls the various sections. The communication section 63 communicates with another apparatus having a communication function. The communication function selection section (pattern selection section) 64 selects a diffusion code pattern to be used based on the connection ID. A group of diffusion code patterns 65 includes a table containing a plurality of diffusion code patterns (1, 2, . . . , n).

A communication operation using a diffusion code pattern according to the present embodiment will now be described.

Figure 30:
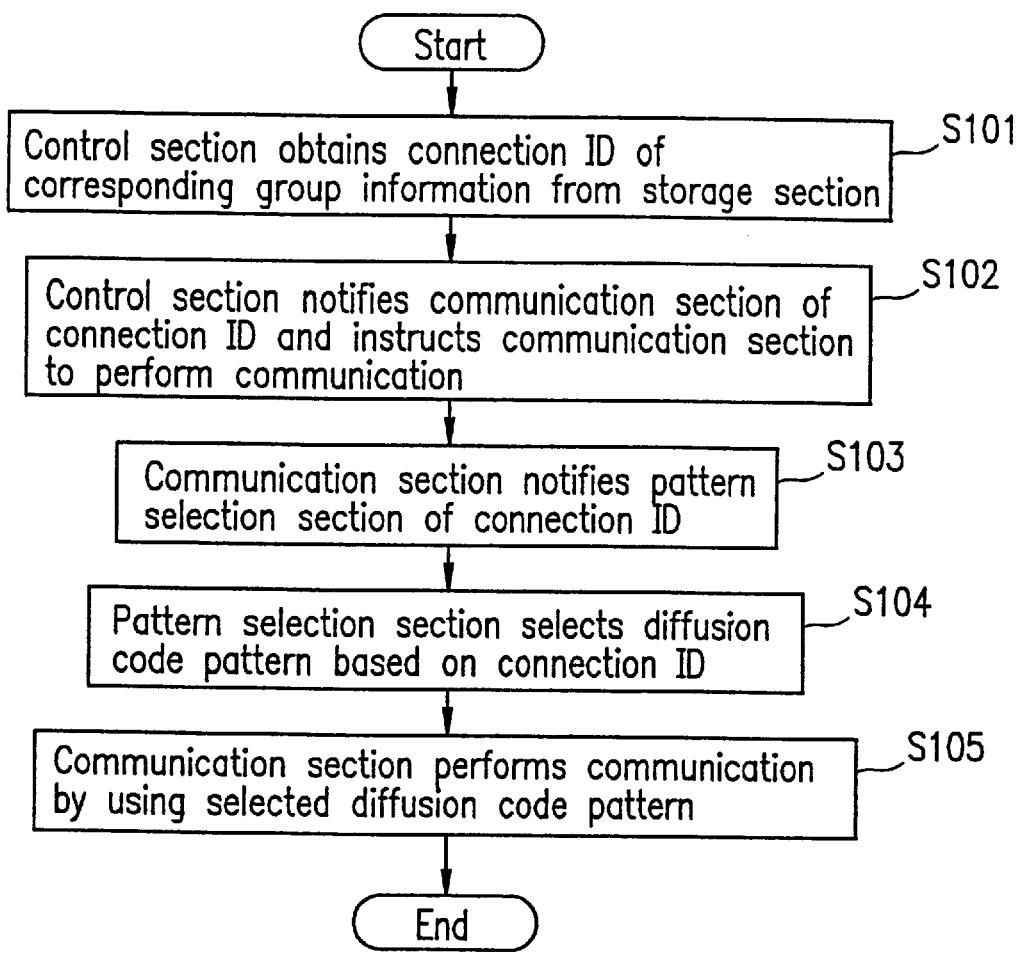
FIG. 30 is a flow chart illustrating a procedure of diffusion code pattern selection according to Embodiment 11 of the present invention.

Referring to a flow chart illustrated in FIG. 30, in a data communication operation, the control section 62 first searches the storage section 61 for corresponding group information and obtains a connection ID (S101). Then, the control section 62 notifies the communication section 63 of the connection ID and instructs the communication section 63 to perform data communication (S102). The communication section 63 notifies the pattern selection section 64 of the connection ID (S103), and the pattern selection section 64 selects and sets a diffusion code pattern to be used in the data communication operation based on the connection ID (S104). The communication section 63 performs a data communication operation based on the set diffusion code pattern (S105).

For the partner apparatus having a communication function, a diffusion code pattern can be selected in a similar procedure. Thus, apparatuses for which the same diffusion code pattern has been selected can communicate with each other.

As described above in detail, according to the present invention, the user can easily select one or more of a plurality of apparatuses capable of communicating with one another so as to group and register the selected apparatuses or to cancel the grouping of the selected apparatuses, based on the number of times a button is depressed and timings of the button depression, even when an identification code or ID information is not provided in advance and even under circumstances where there is no main unit. Moreover, it is possible to generate connection ID information based on the number of times the button is depressed and timings of the button depression. Thus, the user can prevent the user from being interfered with other undesired users, thereby enhancing the level of security.

A plurality of apparatuses can easily be grouped and registered or canceled from grouping registration at once by using various types of information other than the timings of button depression such as changes in light, sound, vibration, wind force, temperature, speed, image, etc.

The generated connection ID information can be shared between the user's apparatus and the partner apparatuses for use as a common key in an encrypted communication process. Moreover, the connection ID information can be used for selection of a communication protocol, a frequency hopping pattern in radio communications, a diffusion code pattern, etc. Thus, various functions can be easily realized.

Moreover, it is possible to register an interconnection pattern between different apparatuses. Thus, the user can operate one apparatus so as to automatically operate the other apparatus(es) in an interconnected manner.

Furthermore, a recording medium in which a program for use in a grouping operation is recorded can be used. In such a case, the grouping operation can be used with a wide variety of apparatuses capable of communicating with one another. Thus, a grouping technique can be widely applied to a wide variety of fields.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus including a communication section for communicating with another apparatus, the apparatus comprising:
   a registration detection section for detecting grouping registration information which is provided to each of a plurality of apparatuses to be grouped and registered;
   a storage section for storing group information which indicates that the apparatus and the other apparatus are in the same group; and
   a control section for controlling the communication section, the registration detection section and the storage section, wherein
      the control section generates connection ID information based on the detected grouping registration information, receives first connection information transmitted from the other apparatus, determines whether or not the first connection information matches with second connection information which is based on the connection ID information and, if it is determined that the first connection information matches with the second connection information, stores the first connection information as the group information in the storage section.

2. An apparatus according to claim 1, wherein the storage section is capable of storing the group information even after a power supply is turned OFF.

3. An apparatus according to claim 1, wherein the storage section is capable of deleting the group information stored in the storage section by turning OFF a power supply.

4. An apparatus according to claim 1, further comprising a cancellation detection section for detecting grouping registration cancellation information which is provided to an apparatus to be canceled from the grouping, wherein
   the control section generates connection ID information based on the detected grouping registration cancellation information, determines whether or not the first connection information stored in the storage section matches with the second connection information and, if it is determined that the first connection information matches with the second connection information, deletes the first connection information stored in the storage section.

5. An apparatus according to claim 1, further comprising a location detection section for detecting location information which indicates a location of the apparatus, wherein
   the control section deletes the first connection information stored in the storage section depending upon the detected location information.

6. An apparatus according to claim 1, further comprising a time detection section for detecting an elapsed time, wherein
   the control section deletes the first connection information stored in the storage section depending upon the detected elapsed time.

7. An apparatus according to claim 1, wherein the control section measures the number of times the apparatus has been connected to the other apparatus and, if the measured number of times exceeds a predetermined number of times, deletes the first connection information stored in the storage section.

8. An apparatus according to claim 1, further comprising a display section for displaying a list of at least one connection information including the first connection information stored in the storage section.

9. An apparatus according to claim 1, wherein:
   the storage section stores an operation procedure of the apparatus; and
   at least one of the plurality of apparatuses which have been grouped and registered operates according to the operation procedure stored in the storage section.

10. An apparatus according to claim 9, wherein at least one of the plurality of apparatuses which have been grouped and registered operates depending upon a combination of the plurality of apparatuses which have been grouped and registered.

11. An apparatus according to claim 4, wherein the control section authenticates the connection ID information when performing at least one of the grouping registration and grouping registration cancellation.

12. An apparatus according to claim 4, wherein at least one of the grouping registration and grouping registration cancellation is performed by a dedicated grouping apparatus.

13. An apparatus according to claim 4, wherein at least one of the grouping registration information and the grouping registration cancellation information represents at least one of: the number of times a button is depressed within a predetermined period and a timing of button depression; a timing of turning ON/OFF a light; sound information; a timing of vibration; wind force information; temperature information; speed information; and image information.

14. An apparatus according to claim 4, wherein the control section notifies a user that at least one of the grouping registration information and the grouping registration cancellation information has been performed.

15. A method for grouping together a plurality of apparatuses including a first apparatus and a second apparatus, wherein each of the plurality of apparatuses includes a communication section for communicating with the other apparatuses, the method comprising the steps of:

provliding the same grouping registration information to the plurality of apparatuses;

generating, in each of the plurality of apparatuses, the same connection ID information based on the same grouping registration information provided;

transmitting to the second apparatus first connection information which is based on the connection ID information generated in the first apparatus; and determining whether or not the first connection information transmitted from the first apparatus matches with second connection information which is based on the connection ID information generated in the second apparatus and, if it is determined that the first connection information matches with the second connection information, storing the first connection information in the second apparatus as group information which indicates that the first apparatus and the second apparatus are in the same group.

16. A recording medium in which a program is recorded, the program being provided for controlling a computer to perform a grouping process for grouping together a plurality of apparatuses including a first apparatus and a second apparatus, wherein each of the plurality of apparatuses includes a communication section for communicating with the other apparatuses, the grouping process comprising the steps of:

providing the same grouping registration information to the plurality of apparatuses;

generating, in each of the plurality of apparatuses, the same connection ID information based on the same grouping registration information provided;

transmitting to the second apparatus first connection information which is based on the connection ID information generated in the first apparatus; and determining whether or not the first connection information transmitted from the first apparatus matches with second connection information which is based on the connection ID information generated in the second apparatus and, if it is determined that the first connection information matches with the second connection information, storing the first connection information in the second apparatus as group information which indicates that the first apparatus and the second apparatus are in the same group.

\* \* \* \* \*